(12) United States Patent
Cypher

(10) Patent No.: US 6,473,880 B1
(45) Date of Patent: Oct. 29, 2002

(54) SYSTEM AND METHOD FOR PROTECTING DATA AND CORRECTING BIT ERRORS DUE TO COMPONENT FAILURES

(75) Inventor: Robert Cypher, Los Gatos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/323,795

(22) Filed: Jun. 1, 1999

(51) Int. Cl.[7] ................... G06F 11/00; H03M 13/00
(52) U.S. Cl. ................................. 714/800; 714/785
(58) Field of Search .................. 714/758, 755–757, 714/761, 765, 800–804, 777, 785, 762; 375/254, 285; 708/531

(56) References Cited

U.S. PATENT DOCUMENTS

| | | | | |
|---|---|---|---|---|
| 3,755,779 A | * | 8/1973 | Price | 714/772 |
| 3,859,630 A | * | 1/1975 | Bennett | 714/757 |
| 4,359,772 A | * | 11/1982 | Patel | 714/761 |
| 4,881,232 A | | 11/1989 | Sako et al. | 714/755 |
| 4,995,041 A | | 2/1991 | Hetherington et al. | 714/763 |
| 5,450,340 A | | 9/1995 | Nicolaidis | 708/531 |
| 5,612,965 A | | 3/1997 | Michaelson | 714/800 |
| 5,642,366 A | | 6/1997 | Lee et al. | 714/762 |
| 5,831,999 A | | 11/1998 | Yamamura | 714/755 |
| 5,872,799 A | | 2/1999 | Lee et al. | 714/755 |
| 6,393,597 B1 | * | 5/2002 | Cypher | 714/755 |

FOREIGN PATENT DOCUMENTS

GB 2 216 690 10/1989 ........... G06F/11/10

OTHER PUBLICATIONS

Dell, "A White Paper on the Benefits of Chipkill–Correct ECC for PC Server Main Memory," IBM Microelectronics Division, Nov. 1997, pp. 1–23.
"Parallel Parity," http:/bbs–koi.uniinc.msk.ru/tech1/1994/er_cont/block.htm, 1994, 1 pg.
"Modulo–2 Arithmetic," http://bbs–koi.uniinc.msk.ru/tech1/1994/er_cont/modulo.htm, 1994 1 pg.
"Introduction to Error Control," http://bbs–koi.uniinc.msk.ru/tech1/1994/er_cont/intro.htm, 1994 1 pg.
Barker et al. "ASCII Table," http://www.eng2.uconn.edu/cse.Cour . . . 08W/References/Ref_ASCIITable.htlm, Feb. 1998, 1 pg.

(List continued on next page.)

Primary Examiner—Albert Decady
Assistant Examiner—Guy J. Lamarre
(74) Attorney, Agent, or Firm—B. Noël Kivlin

(57) ABSTRACT

A system for protecting data and correcting bit errors due to component failures includes a check bits generation unit which receives and encodes data to be protected. The check bits generation unit effectively partitions the data into a plurality of logical groups. The check bits generation unit generates a parity bit for each of the logical groups, and additionally generates a global error correction. The global error correction code is equivalent to the result of generating individual error correction codes for each logical group and combining them in a predetermined manner. An error correction unit is coupled to receive the plurality of data bits and the check bits following storage or transmission. A global syndrome code is generated such that, with knowledge of the specific logical groups that have a single bit error, a value indicative of the location of the error in such groups may be derived from the global syndrome code.

40 Claims, 31 Drawing Sheets

OTHER PUBLICATIONS

"Parity & Computing parity," http://bbs–koi.uniinc.msk.ru/tech1/1994/er_cont/parity.htm, 1994, 2 pgs.

"Error Correction with Hamming Codes," http://bbs–koi.uniinc.msk.ru/tech1/1994/er_cont/hamming.htm, 1994, 2 pgs.

Barker et al. "Hamming Code, Background Information," http://www.eng2.uconn.edu/cse/Courses/CSE208W/Hamming/Background.html, Feb. 1998, 3 pgs.

Barker et al., "Hamming Code, Theory," http://www.eng2.uconn.edu/cse/Courses/CSE208W/Hamming/Theory.html, Mar. 1998, 2 pgs.

"NUMA: Delivering the Next Level of Commodity SMP Performance," http://199.245.235.23/newsletters/html/vpoint5.html, 1996, 4 pgs.

Barker et al. "General Definitions," http://www.eng2.uconn.edu/cse/Cour . . . 8W/References/Ref_Definitions.html, Feb. 1998, 3 pgs.

Barker et al. "Hamming Code, Lab Procedure," http://www.eng2.uconn.edu/cse/Courses/CSE208W/Hamming/Procedure.html, Jun. 1998, 3 pgs.

Burskirk, "32–Bit–Wide Memory Tolerates Failures," NT Tech Notes, Oct. 1990, p. 818.

International Search Report, Application No. PCT/US 00/14944, mailed Sep. 27, 2000.

* cited by examiner

| CHECK BIT | DATA BITS |
|---|---|
| P1 | D4,D3,D1 |
| P2 | D4,D2,D1 |
| P3 | D3,D2,D1 |

DATA BLOCK

| BIT POSITION | 1 | 2 | 3 | 4 | 5 | 6 | 7 |
|---|---|---|---|---|---|---|---|
| PARITY / DATA BIT | P1 | P2 | D4 | P3 | D3 | D2 | D1 |

*FIG. 3*
(Prior Art)

| RECEIVED BITS | SYNDROME |
|---|---|
| P1, D4, D3, D1 | S1 |
| P2, D4, D2, D1 | S2 |
| P3, D3, D2, D1 | S3 |

*FIG. 4*
(Prior Art)

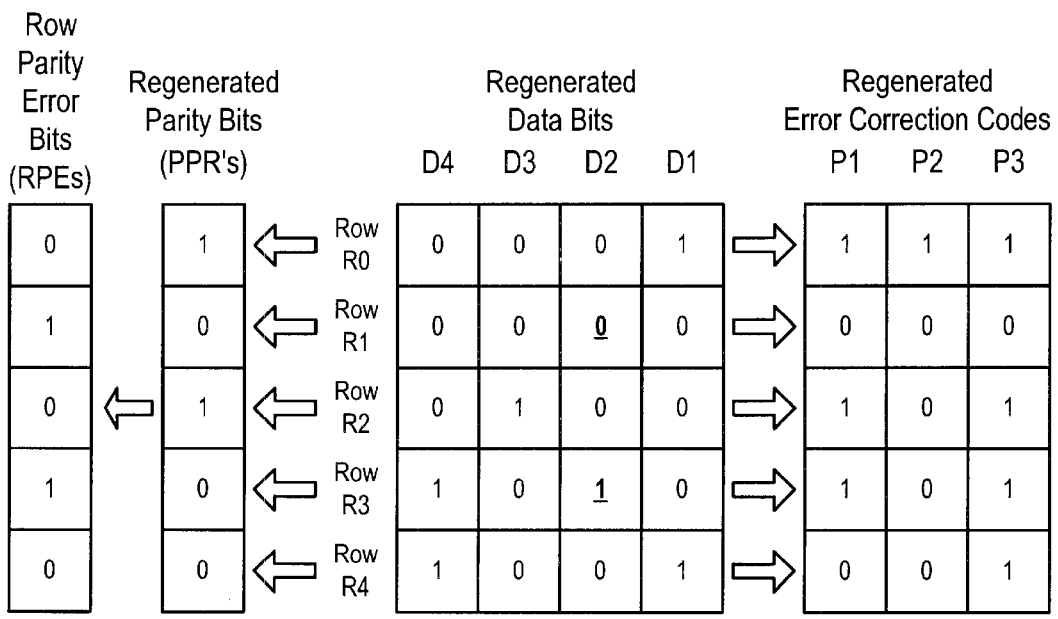
FIG. 7A
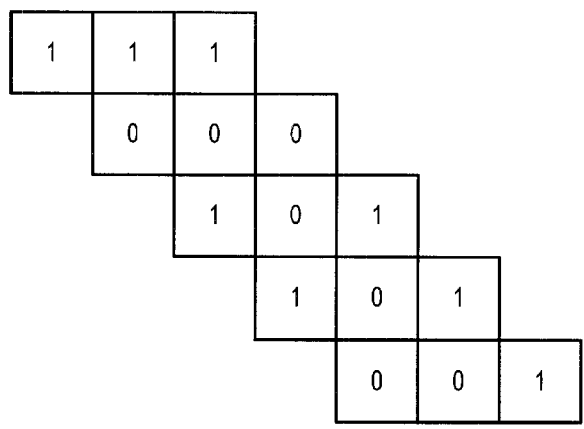
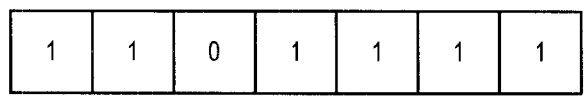
FIG. 7B

FIG. 20

Parity Generation Matrix for Group G[0]

FIG. 21

Parity Generation Matrix for Group G[1]

FIG. 22 Parity Generation Matrix for Group G[2]

Parity Generation Matrix for Group G[4]

FIG. 25  Parity Generation Matrix for Group G[5]

FIG. 26 Parity Generation Matrix for Group G[6]

FIG. 27

Parity Generation Matrix for Group G[7]

FIG. 28

Parity Check Matrix for Group G[0]

FIG. 29

Parity Check Matrix for Group G[1]

FIG. 30

Parity Check Matrix for Group G[2]

FIG. 31 Parity Check Matrix for Group G[3]

FIG. 32

Parity Check Matrix for Group G[4]

Parity Check Matrix for Group G[6]

| G[6]: | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|---|
| Holds: | P6 | D199 | D200 | D201 | D202 | D203 | D204 | D205 | D206 | D207 | D208 | D209 | D210 | D211 | D212 | D213 | D214 | D215 | D216 | D217 | D218 | D219 | D220 | D221 | D222 | D223 | D224 | D225 | D226 | D227 | D228 | D229 | 1,1,1 | D230 | D231 | D232 |
| Q[7] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[6] | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| Q[5] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[4] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[3] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[2] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[1] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Q[0] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[12] | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| V[11] | 0 | 0 | 0 | 0 | 0 | 0 | 1 | 0 | 0 | 0 | 1 | 1 | 0 | 0 | 1 | 1 | 0 | 0 | 0 | 0 | 1 | 0 | 1 | 0 | 0 | 1 | 0 | 1 | 1 | 1 | 1 | 1 | 0 | 0 | 0 | 0 |
| V[10] | 0 | 0 | 0 | 0 | 0 | 1 | 1 | 1 | 1 | 1 | 0 | 1 | 0 | 1 | 1 | 1 | 0 | 0 | 1 | 0 | 0 | 1 | 0 | 1 | 0 | 0 | 0 | 0 | 0 | 1 | 1 | 1 | 0 | 1 | 1 | 0 |
| V[9] | 0 | 0 | 0 | 0 | 0 | 0 | 1 | 1 | 0 | 1 | 1 | 1 | 0 | 1 | 0 | 1 | 0 | 1 | 0 | 1 | 1 | 0 | 1 | 1 | 0 | 0 | 0 | 0 | 0 | 1 | 0 | 1 | 0 | 1 | 0 | 1 |
| V[8] | 0 | 0 | 0 | 0 | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 | 0 | 0 | 0 | 1 | 0 | 1 | 1 | 1 |
| V[7] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[6] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[5] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[4] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[3] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[2] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[1] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| V[0] | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 35

Parity Check Matrix for Group G[7]

SYSTEM AND METHOD FOR PROTECTING DATA AND CORRECTING BIT ERRORS DUE TO COMPONENT FAILURES

BACKGROUND OF THE INVENTION

1. Field of the Invention

This invention relates to error correction in electronic systems and, more particularly, to systems that employ error correction codes to facilitate correction of bit errors due to, for example, component failures.

2. Description of the Related Art

Error codes are commonly used in electronic systems to detect and correct data errors, such as transmission errors or storage errors. For example, error codes may be used to detect and correct errors in data transmitted via a telephone line, a radio transmitter, or a compact disc laser. Error codes may additionally be used to detect and correct errors associated with data stored in he memory of computer systems. One common use of error codes is to detect and correct errors of data transmitted on a data bus of a computer system. In such systems, error correction bits, or check bits, may be generated for the data prior to its transfer or storage. When the data is received or retrieved, the check bits may be used to detect and correct errors within the data.

Component failures are a common source of error in electrical systems. Faulty components may include faulty memory chips or faulty data paths provided between devices of a system. Faulty data paths can result from, for example, faulty pins, faulty data traces, or faulty wires.

Hamming codes are a commonly used type of error code. The check bits in a Hamming code are parity bits for portions of the data bits. Each check bit provides the parity for a unique subset of the data bits. If an error occurs (i.e. one or more of the data bits change state), one or more of the check bits upon regeneration will also change state (assuming the error is within the class of errors covered by the code). By determining the specific bits of the regenerated check bits that changed state, the location of the error within the data may be determined. For example, if one data bit changes state, this data bit will cause one or more of the regenerated check bits to change state. Because each data bit contributes to a unique group of check bits, the check bits that are modified will identify the data bit that changed state. The error may be corrected by inverting the bit identified as being erroneous.

One common use of Hamming codes is to correct single bit errors within a group of data. Generally speaking, the number of check bits must be large enough such that $2^k-1$ is greater than or equal to n+k where k is the number of check bits and n is the number of data bits. Accordingly, seven check bits are typically required to implement a single error correcting Hamming code for 64 data bits. A single error correcting Hamming code is capable of detecting and correcting a single error.

FIGS. 1–3 illustrate an example of a system employing a single-error correction (SEC) Hamming code. In this example, four data bits (D4, D3, D2, and D1) are protected using three check bits (P1, P2, and P3). The parity generator 10 (FIG. 1) is used to encode the data block that contains the data bits and the check bits. The encoding process is performed prior to storing or communicating the data. FIG. 2 shows an assignment of data bits to calculate the check bits. In this example, the check bit P1 is generated by an XOR (exclusive OR) of the binary values in D4, D3, and D1. Similarly, the check bit P2 is generated by an XOR of the binary values in D4, D2, and D1, and the check bit P3 is generated by an XOR of the binary values in D3, D2 and D1. FIG. 3 shows the bit positions and the corresponding content of these positions within the encoded data block. The data block, which includes the data bits and the generated check bits, may then be stored in a memory chip or communicated over a data communication path.

At the point of receipt, the data block is retrieved and decoded. The decoding process involves performing a validity check on the received word, and executing an error correction technique if an error was detected. To check whether an error occurred in the storage (or transmission) of the data block, the check bits P1, P2, and P3 are effectively regenerated using the received data, and each regenerated check bit is XORed with the corresponding received check bit to generate a corresponding syndrome bit. FIG. 4 is a table depicting a manner in which these syndrome bits may be generated. More particularly, syndrome bit S1 may be generated by XORing the received binary values in P1, D4, D3, and D1. If none of the received data bits (D4, D3, D1) is erroneous, the value of the received check bit P1 is effectively XORed with itself, and the syndrome bit S1 will be 0 (assuming the original check bit P1 is not erroneous). If one of the data bits (D4, D3, D1) or the check bit P1 is erroneous, the syndrome bit S1 will be 1 (asserted), thus indicating an error. Syndrome bits S2 and S3 may be generated similarly. Taken collectively, the syndrome bits S1, S2 and S3 may be used to identify the location of an erroneous bit. For example, the binary value of the syndrome bits in the order [S3, S2, S1] indicates the position of the erroneous bit within the 7 bit data block as depicted in FIG. 3. If the syndrome code is all zeros (i.e. "000"), the data has no single bit error. Upon identification of the erroneous bit position, the error is corrected by inverting the binary value in that position, i.e. from 0 to 1 or from 1 to 0.

It is a common practice to store data in, or communicate data through, multiple components. For example, a data block may be stored in a plurality of memory chips, or it may be communicated through a plurality of wires. An error may be introduced if one of the components is faulty. A Hamming code such as that described above may be used to address error correction in such systems.

For example, consider the case of storing D bits of data that are protected by C check bits using M memory chips. The data block therefore contains D+C bits. If the data block is to be evenly divided among the M memory chips, each memory chip will store X of the data and/or check bits of the data block, where X=(D+C)/M. The standard approach to providing error correction for chip failures is to divide the D+C data and check bits into X logical groups each including M bits, and assigning 1 bit from each chip to each of the groups. The check bits in each group form a SEC (single-error correcting) code such as a Hamming code. When any chip fails, it introduces at most one error into each group, and these errors are corrected independently using the SEC codes. If a Hamming code is used in each group, a total of C=X*L check bits are required, where L is the smallest integer such that 2^L>M. This standard approach is inefficient because each group is able to independently identify which bit (if any) within the group is in error. However, if the only failures considered are memory chip failures, the failures in different groups are highly correlated.

It would be desirable to provide a system and method which allow for the reliable storage or transmission of data in environments wherein component failures are possible. In particular, it would be desirable to provide a system and method which allows errors in data to be detected and corrected while reducing the number of check bits which must be transmitted or stored.

SUMMARY OF THE INVENTION

The problems outlined above may in large part be solved by a system and method for detecting and correcting errors in a data block in accordance with the present invention. In one embodiment, a check bits generation unit receives and encodes data to be protected. The check bits generation unit effectively partitions the data into a plurality of logical groups. The check bits generation unit generates a parity bit for each of the logical groups, and additionally generates a global error correction.

The global error correction code is indicative of a predetermined combination of a set of error correction codes each individually associated with a corresponding logical group. In various embodiments, the global error correction code is equivalent to the result of generating individual error correction codes for each logical group and combining them in a predetermined manner.

In one particular embodiment, the data is divided into a total of X logical groups.

The global error correction code may be equivalent to the result of (or may be derived by) shifting (either linearly or cyclically) the error correction code for a given ith group by i bit positions, wherein i=0 to X−1, and by XORing corresponding columns of the resulting shifted error correction codes together. The global error correction code, which in this case is referred to as having "twisted check" bits (by virtue of the selective shifting of the individual error correction codes), thus includes a separate bit indicating the parity for each aligned column formed by the collection of resulting shifted error correction codes. The data along with the parity bit for each logical group and the global error correction code are then conveyed through a communication channel or are stored in memory.

Advantageously, the overall number of required check bits (the parity bits for the logical groups and the bits forming the global error correction code) may be smaller than the overall number of bits needed for the collection of error correction codes associated individually with the logical groups. In one implementation, data at corresponding bit positions within the logical groups are conveyed through a common component, such as the same wire, or are stored in the same component, such as the same memory chip. Additionally, data bits at different bit positions within a given logical group are not conveyed through, or are not stored within, a common component.

An error correction unit is coupled to receive the plurality of data bits and the check bits following storage or transmission. The error correction unit is configured to generate a parity error bit for each of the logical groups of data based on the received data bits. The error correction unit may further be configured to generate a regenerated global error correction code in the same manner in which the original global error correction code is derived. Thus, in one embodiment, the regenerated global error correction code is equivalent to the result of (or may be derived by) shifting the regenerated error correction code for a given ith group by i bit positions, wherein i=0 to X−1, and by XORing corresponding columns of the resulting shifted error correction codes together.

A global syndrome code may be generated by XORing the original global error correction code with the regenerated global error correction code. This global syndrome code is indicative of a difference between the original global error correction code and the regenerated global error correction code.

In general, the global syndrome code is generated such that, with knowledge of the specific logical groups that have a single bit error, a value indicative of the location of the error in such groups may be derived from the global syndrome code. The overall number of bits forming the global syndrome code and the parity bits for each logical group is smaller than the overall number of bits needed for the error correction codes individually associated with the logical groups.

In embodiments in which the error correction codes for various logical groups are shifted and XORed, the global syndrome code includes a bit corresponding to each aligned column of the regenerated shifted error correction codes which indicates whether a parity error for that column exists. The existence of a single bit error in any logical group can be determined using the original parity bit and the data received for that group. Additionally, since the class of correctable errors considered by the system is restricted to single bit errors that occur at the same position within the various logical groups (such errors may occur due to single component failures), the error correction code for each logical group that has an error will reflect a change at exactly the same bit positions. Thus, by shifting the various error correction codes in a twisted manner (i.e., shifting some more than others), and XORing the resulting vertically aligned columns, the correlation that exists with respect to the specific bits that change in each error correction code for each logic group with an error (i.e., the error correction code for each logical group having an error will incur a change at exactly the same bit positions) may be exploited to thereby extract information indicating the specific bit position of the errors.

BRIEF DESCRIPTION OF THE DRAWINGS

Other objects and advantages of the invention will become apparent upon reading the following detailed description and upon reference to the accompanying drawings in which:

FIG. 3 (prior art) is an illustration of bit positions and their content for a data block encoded by the parity generator of FIG. 1;

FIG. 4 (prior art) is an assignment table for generating a syndrome code;

FIG. 7A illustrates a manner in which a set of row parity error bits and regenerated error correction codes may be generated;

FIG. 7B illustrates a manner in which a regenerated global error correction code may be generated;

Figure 20:
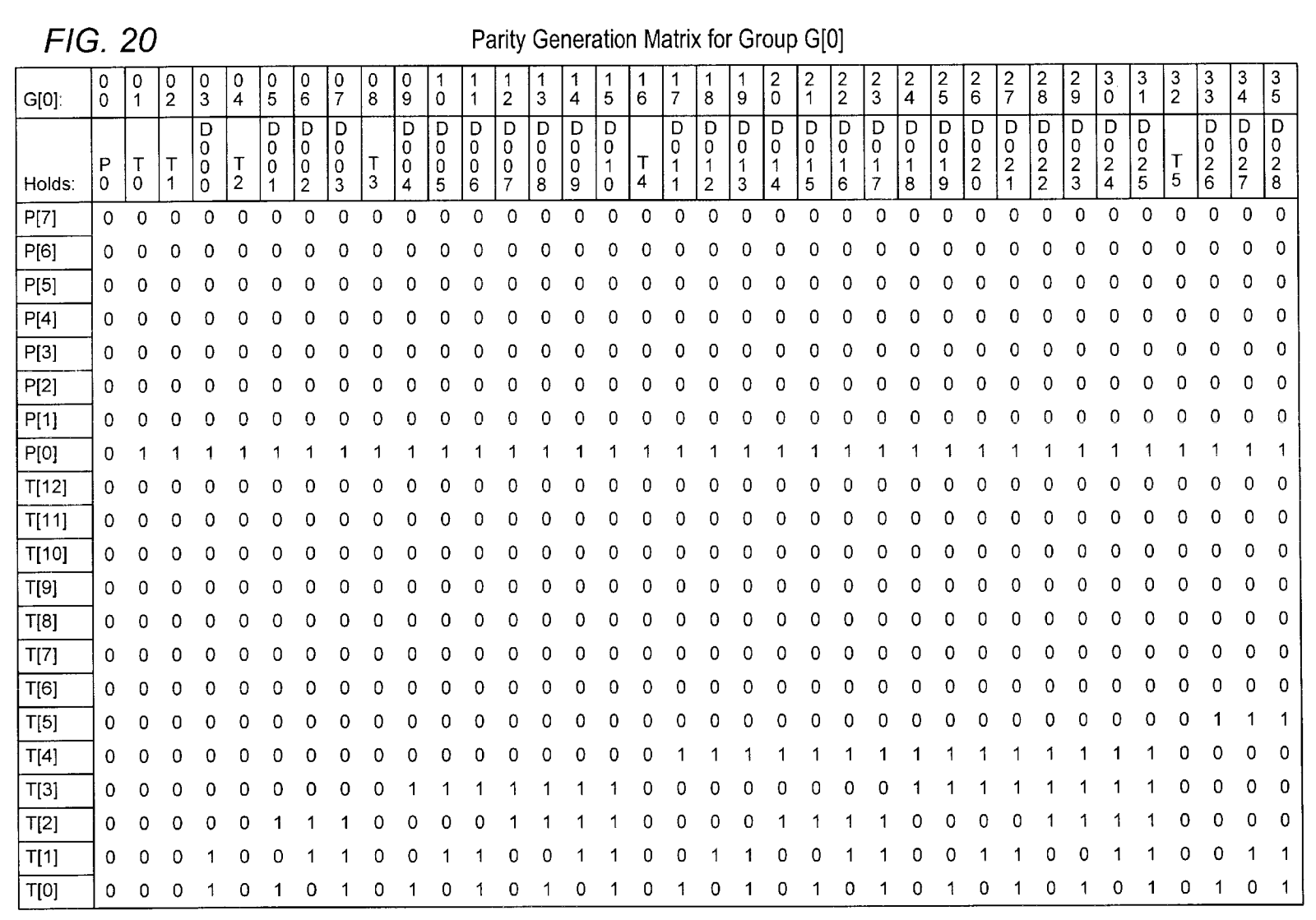
Figure 21:
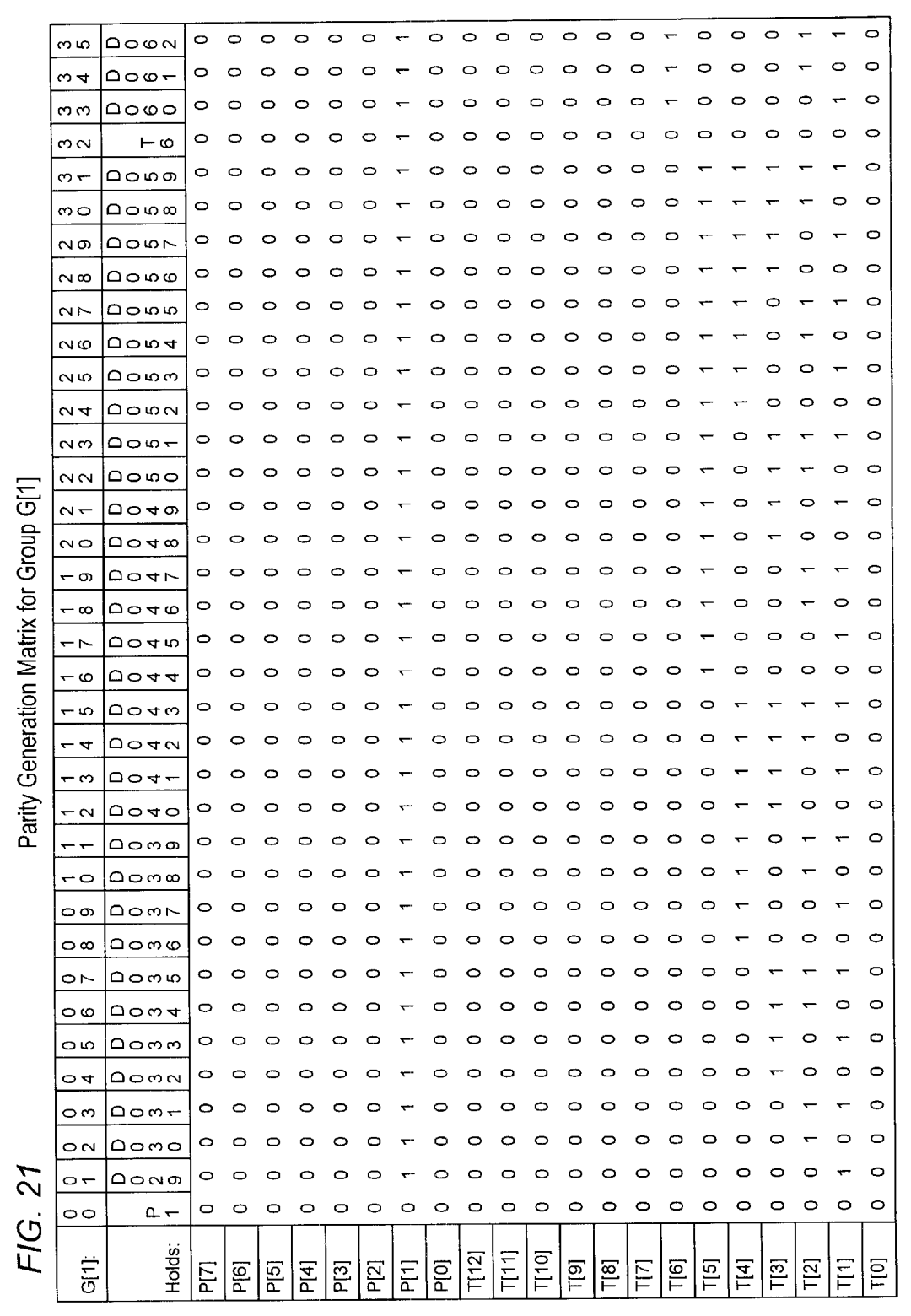
Figure 22:
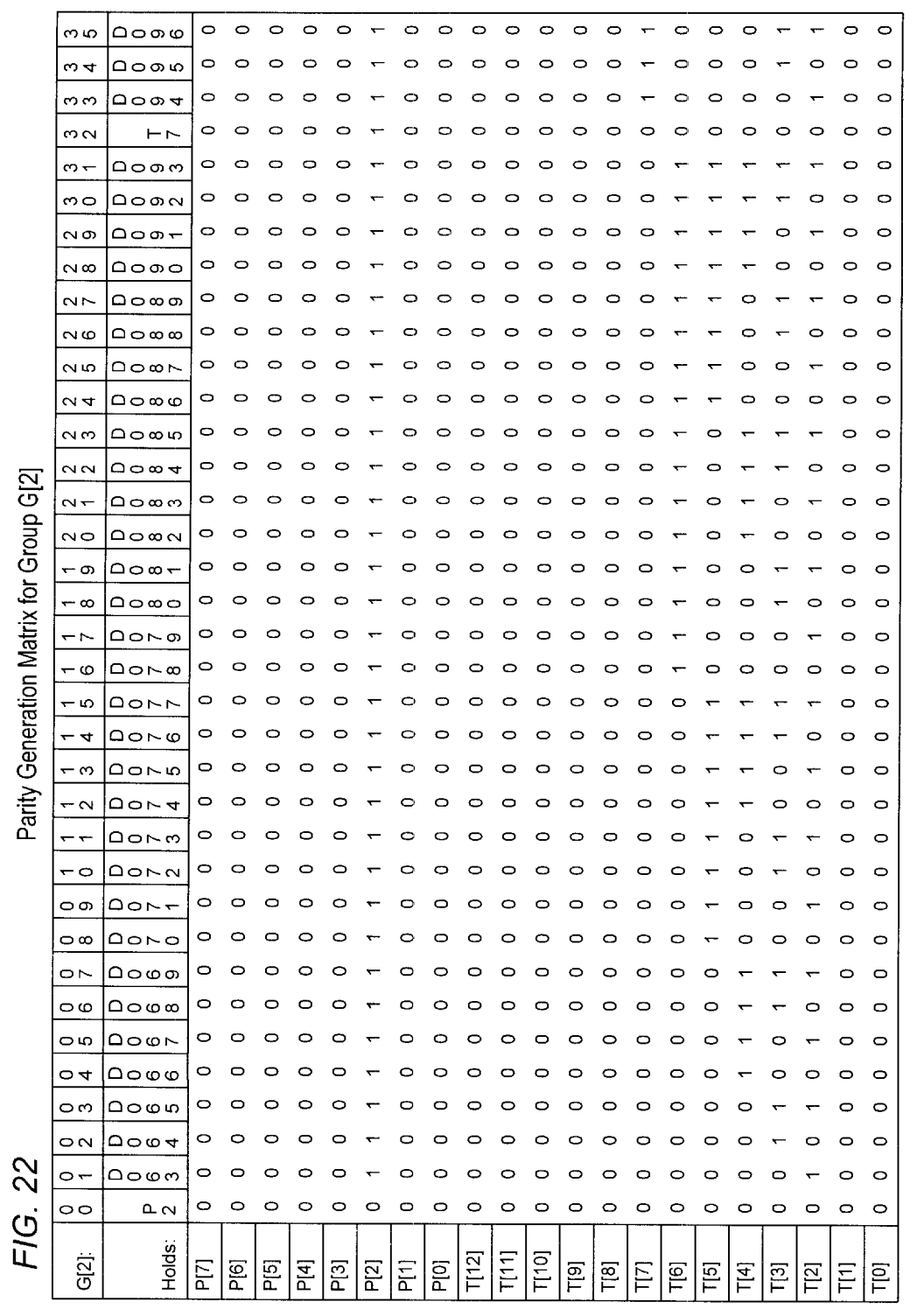
Figure 23:
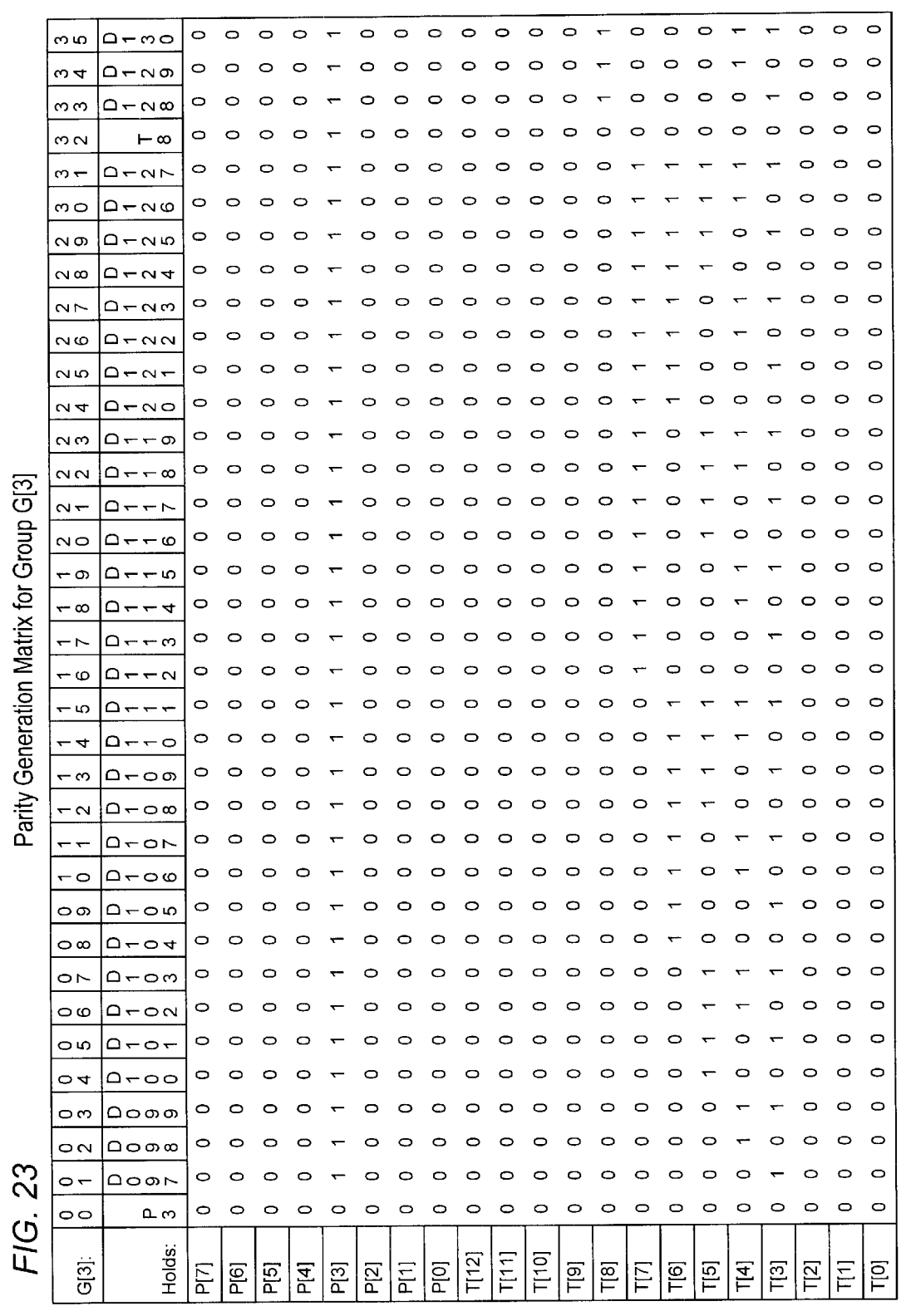
Figure 24:
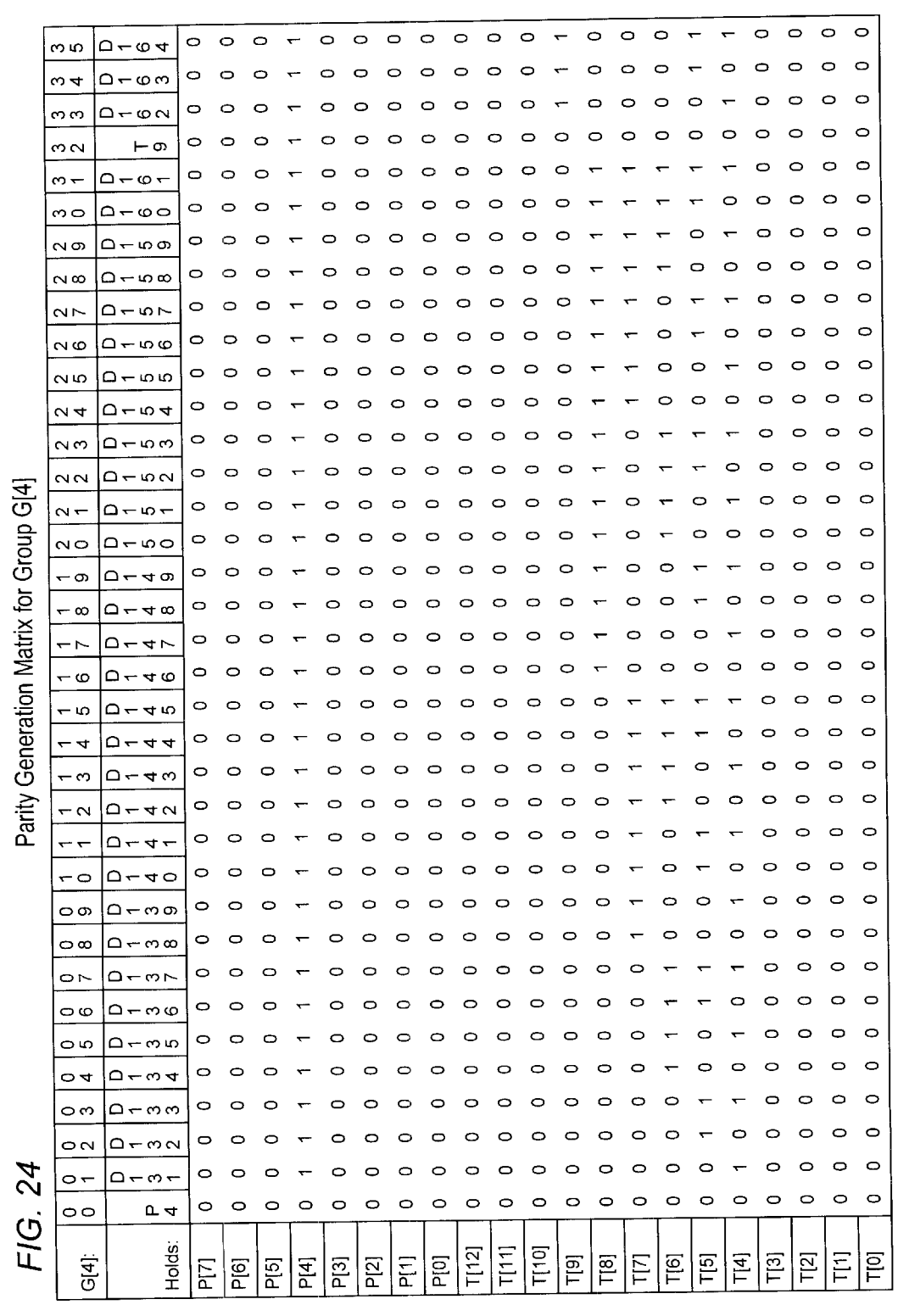
Figure 25:
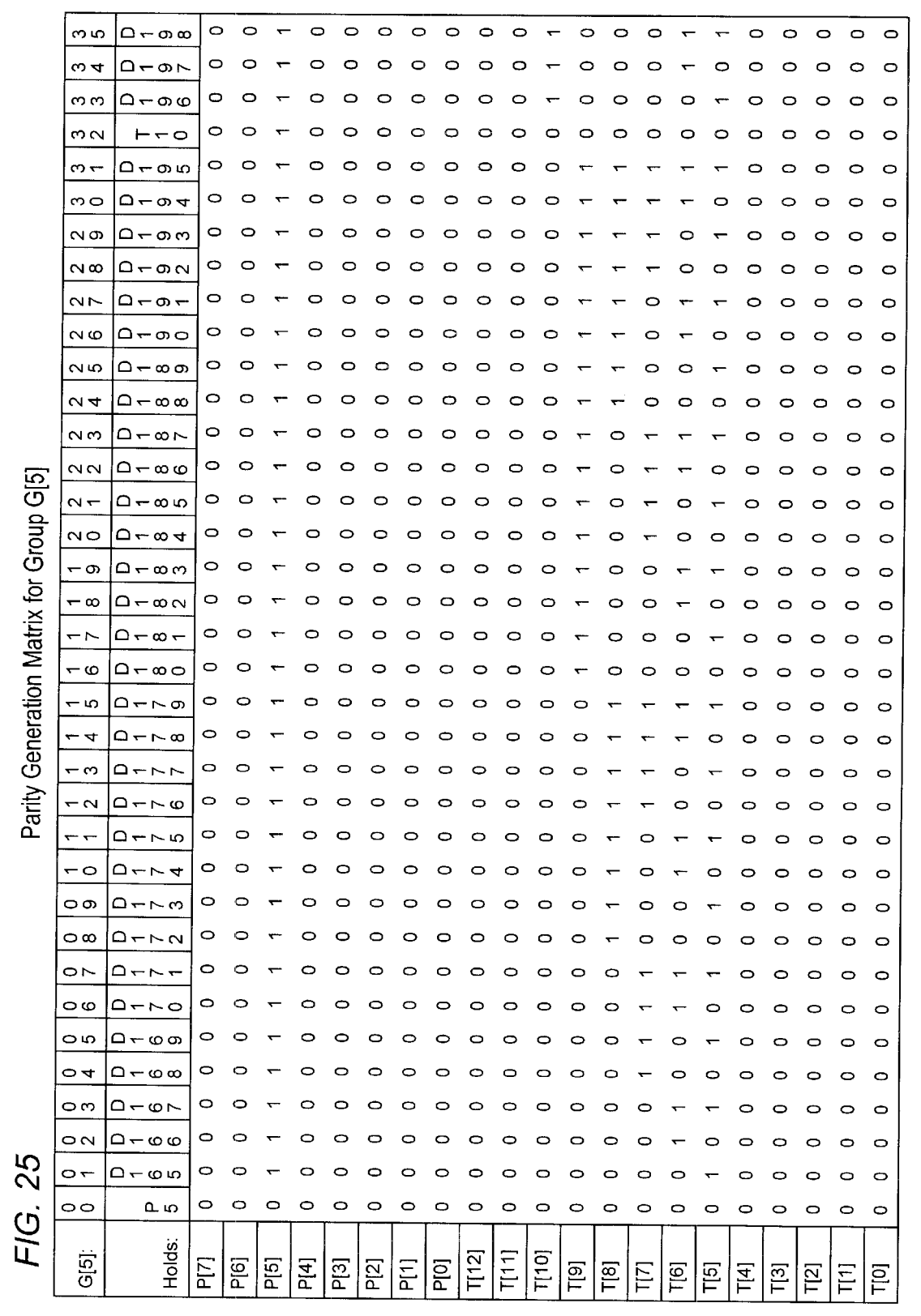
Figure 26:
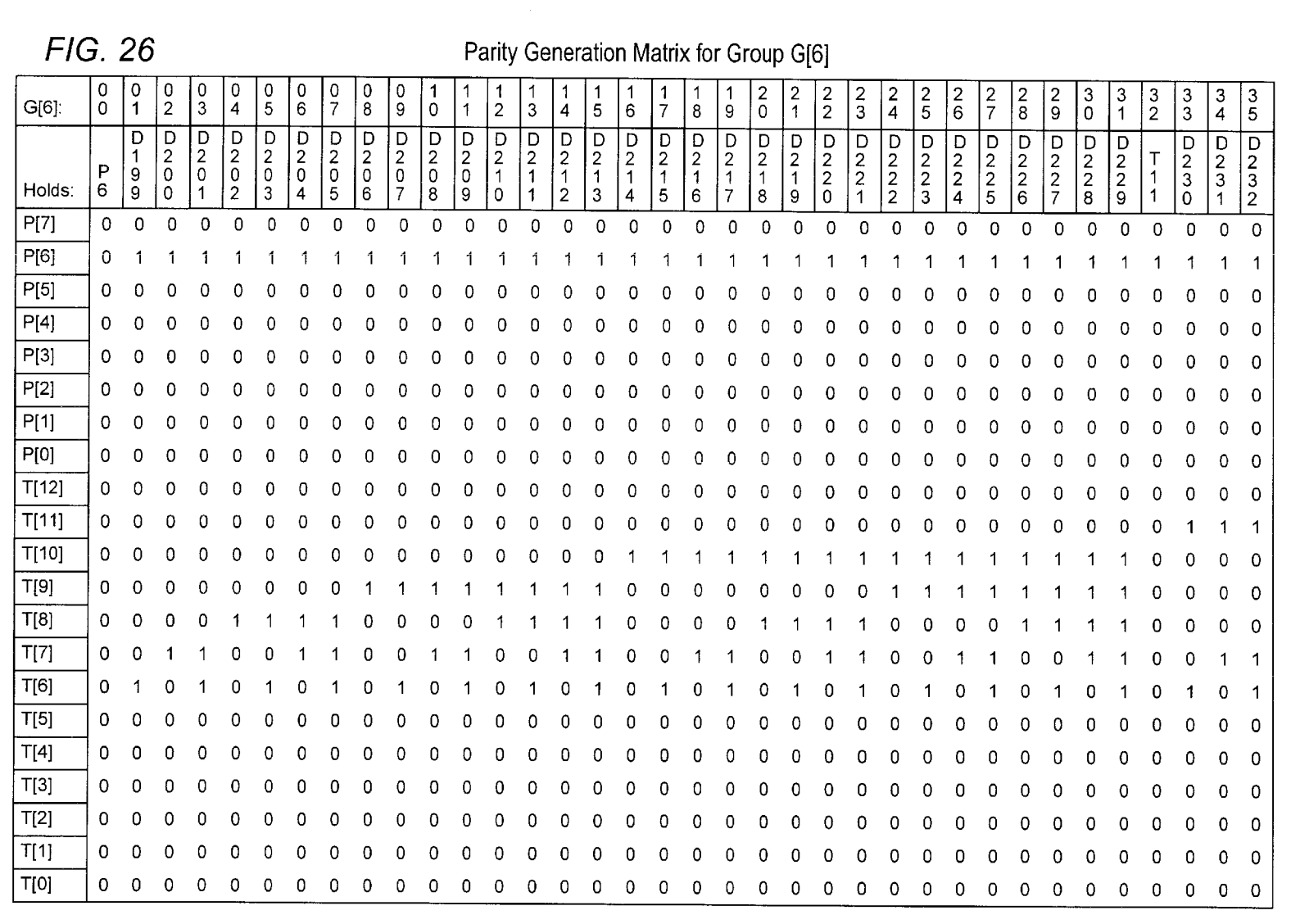
Figure 27:
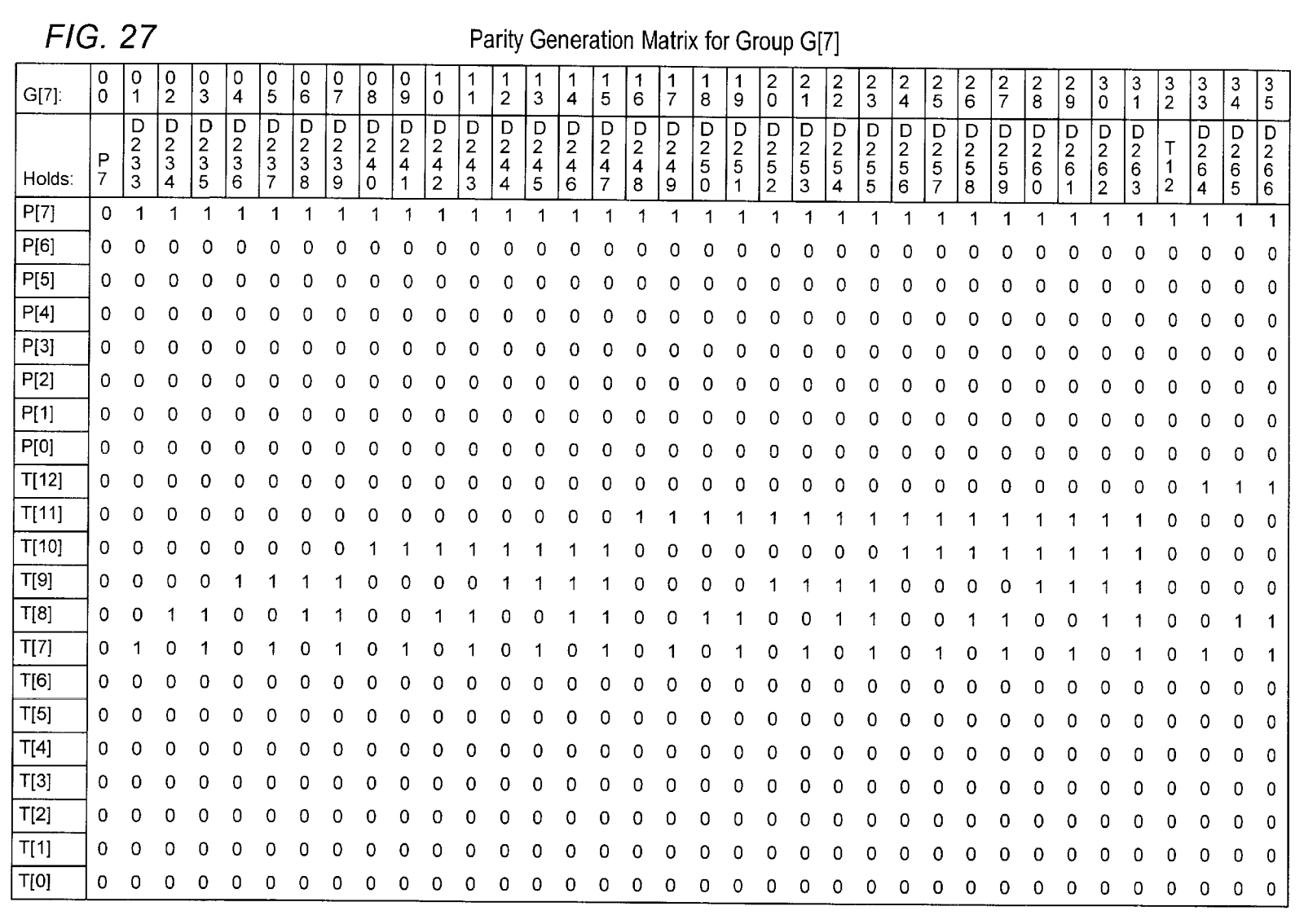

FIGS. 20–27 are assignment tables illustrating the operation of a set of check bits in accordance with another embodiment of the invention;

FIGS. 28–35 are assignment tables illustrating the generation of a set of row parity error bits and regenerated twisted check bits for the embodiment of FIGS. 20–27;

Figures 1, 2:
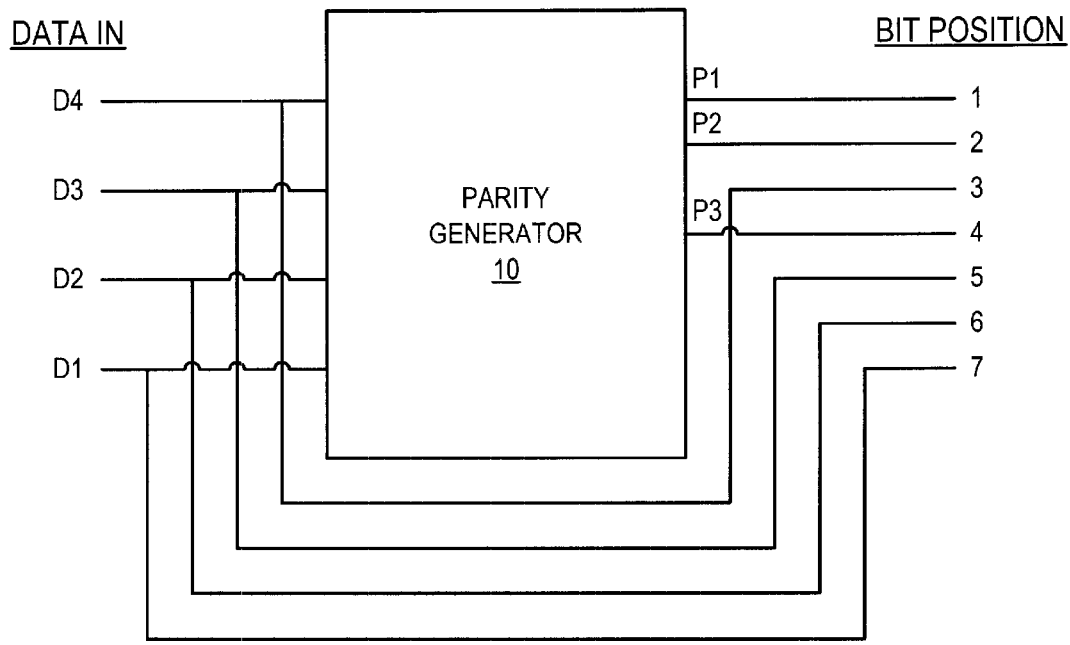
FIG. 1 (prior art) is a block diagram illustrating a parity generator to encode data bits using a single error correcting Hamming code.
FIG. 2 (prior art) is an assignment table to compute a set of check bits.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE DRAWINGS

Figure 5:
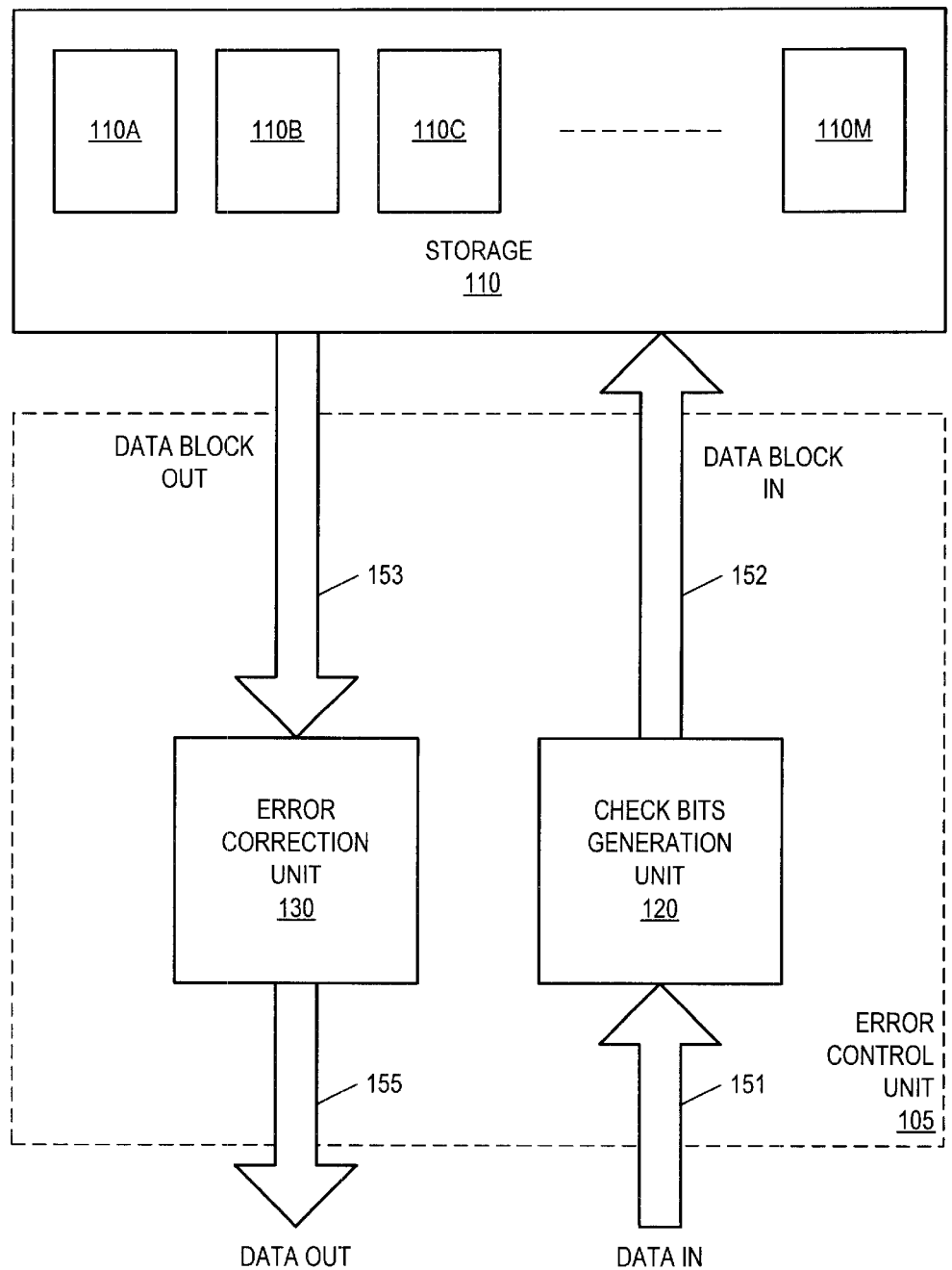
FIG. 5 is a block diagram of a system including an error control unit according to one embodiment of the present invention.

Turning now to FIG. 5, a block diagram of a system including an error control unit 105 is shown according to one embodiment of the present invention. In this particular embodiment, the error control unit 105 is coupled to convey and receive data from storage 110. The storage 110 is configured to store a data block (data bits and check bits) that is communicated from/to the error control unit 105. The storage 110 includes a plurality of memory chips 110A–110M. Each of the memory chips 110A–110M is configured to store a portion of the data block. The memory chips 110A–110M may be any type memory/storage devices usable to store data.

As will be described in further detail below, error control unit 105 is configured to ncode data to be stored in the storage 110, and to decode received encoded data following storage to correct certain categories of bit errors (when they occur) using a relatively small number of check bits as compared with traditional approaches, such as typical single error correcting Hamming codes.

The error control unit 105 includes a check bits generation unit 120 to perform the encoding process and an error correction unit 130 to perform the decoding process and to perform error correction. Data bits are received via data path 151 and are encoded by check bits generation unit 120 prior to storing a data block (data bits and check bits) into storage 110 via data path 152. Subsequently, the stored data block may be retrieved by error correction unit 130 via data path 153. Error correction unit 130 decodes the data block to detect and correct errors in the data. If one or more errors are detected, the errors are corrected. The data bits (corrected, if necessary) are then output via data path 155.

It is noted that check bits generation unit 120 and error correction unit 130 may be implemented in hardware, in software, or using a combination thereof. Various specific implementations are possible.

The operation of error control unit 105 will next be explained with reference to FIGS. 5–8. FIGS. 6A–8B illustrate an example wherein a total of 20 data bits to be stored in storage 110 are protected.

Figure 6A:
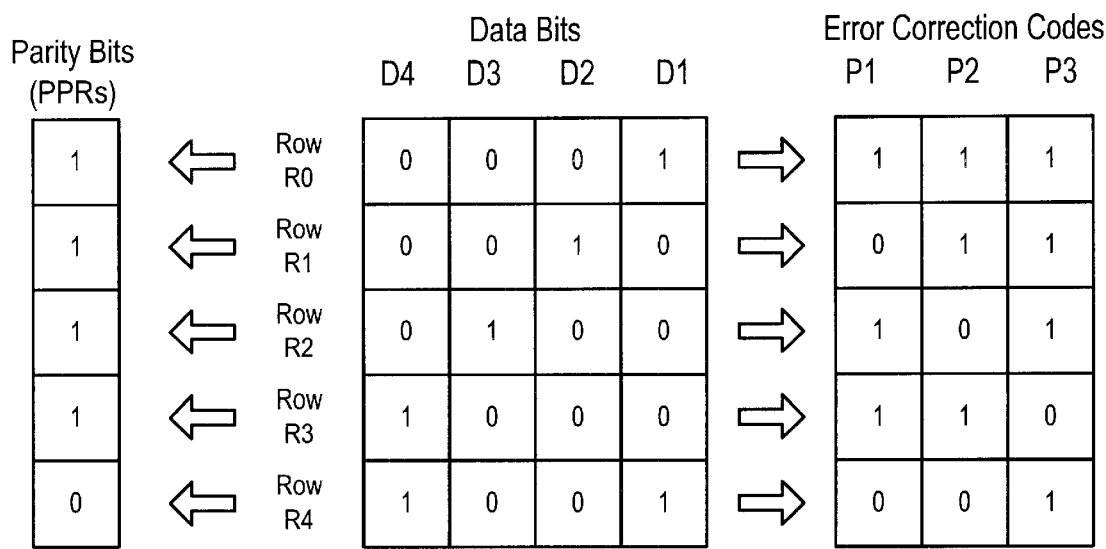
FIG. 6A illustrates an encoding process including the generation of row parity bits and row error correction codes.
Figure 6B:
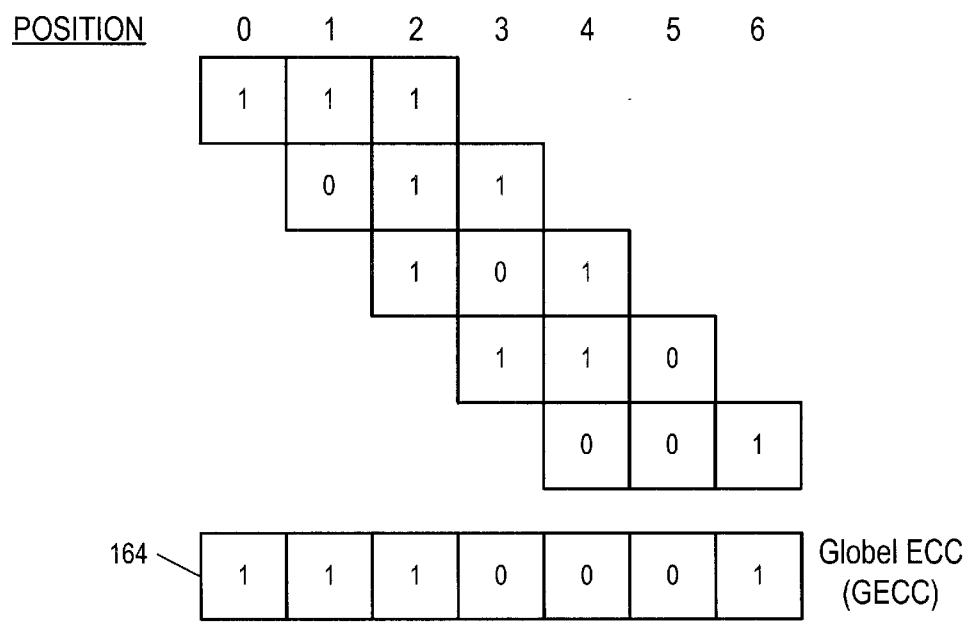
FIG. 6B illustrates a manner in which a global error correction code may be generated.

FIGS. 6A and 6B illustrate an encoding process performed by the check bits generation unit 120 prior to the storage of the data bits. Check bits generation unit 120 receives the 20 data bits (via data path 151) and, in this example, processes the data according to five logical groups, each group forming a respective row R0–R4, as shown in FIG. 6A. A set of columns denoted D4, D3, D2, and D1 is formed by corresponding bit positions of each row. As will be described in further detail below, the data forming each column is stored in the same memory chip, and different bits of each row are stored in different memory chips.

Check bits generation unit 120 is configured to generate a parity bit per row (PPR) and a global error correction code (GECC). The global error correction code is equivalent to, or may be derived from a predetermined logical combination of error correction codes each individually associated with a respective row. The PPR and GECC bits are check bits employed to protect the data bits against at most one error per row, provided that all errors occur in the same column.

The set of parity bits may be calculated using either even or odd parity. Since one parity bit is calculated per row, or logical group, the number of PPR bits equals the number of rows. In the example of FIG. 6A, even parity is used. Thus, for the exemplary data as illustrated, each of the parity bits (PPRs) for rows R0–R3 is 1. The parity bit for row R4 is 0.

FIG. 6A illustrates an error correction code (ECC) associated with each row. In the example of FIG. 6A, the error correction code for each row is calculated according to the assignment table shown in FIG. 2. For example, the error correction code calculated for the data in row R0 is [111], and the error correction code calculated for row R1 is [011], and so on. It is noted, however, that other specific error correction coding techniques may be employed, and that different error correction coding techniques may be associated with differing rows.

FIG. 6B illustrates a manner in which the global error correction code may be generated. More particularly, in this embodiment, the global error correction code may be generated by selectively shifting certain row ECCs with respect to one another and ORing the resulting vertically aligned bits. Since some of the row ECCs are shifted ore than others, the bits forming the global error correction code are referred to as "twisted" check bits. In the embodiment of FIG. 6B, the global error correction code is derived by linearly shifting the error correction code for a given ith group by i bit positions wherein i=0 to X-1, and where X is the total number of rows or logical groups. The bits in each resulting vertically aligned column are then XORed together, to thereby generate the global error correction code (leading or trailing 0s may be added to the entries of each row of the twisted ECCs, as necessary, prior to this XOR operation).

It is noted that in the discussion above relating to FIGS. 6A and 6B, the global error correction code is calculated by first generating the individual error correction codes for each row and logically combining them in a predetermined manner. In other embodiments, the global error correction code may be generated directly from the data bits such that it is equivalent to the result of generating individual error correction codes for each row and combining them in a predetermined manner. For example, the global error correction code illustrated in FIG. 6B could be generated directly from the data bits using a predetermined function, without generating individual error correction codes for each row.

Upon calculation of the global error correction code, the data block including 20 bits of data, the parity bits (PPRs) and the global error correction code (GECC) are conveyed to storage 110. It is noted that the bits forming each column (D4, D3, D2, and D1) of data in the data block are stored in a common memory chip, and that no two data bits in differing bit positions of a particular row are stored in the same memory chip. It is further noted that the parity bits and global error correction code (GECC) may be stored in additional memory chips. A further example of the manner in which the parity bits and the bits forming the global error correction code (GECC) may be distributed for storage within various memory chips will be provided further below in conjunction with FIGS. 20–35.

It is further noted that in the example of FIGS. 6A and 6B, a total of 12 check bits (the parity bits (PPRs) and the bits of the global ECC) are generated for storage along with the 20 data bits. This overall number of check bits is advantageously less than the number of check bits required using conventional methods (wherein, for example, a total of 15 check bits, corresponding to the row error correction codes, are necessary). Generally speaking, in embodiments which employ a linearly shifted global error correction code generated according to the example of FIG. 6B, a total of only (2X+L−1) check bits are needed, where it is assumed that D bits of data are protected with C check bits using M memory chips (where M evenly divides (D+C)), and where X=(D+C)/M and C=X*L where L is the smallest integer such that $2^L \geq M$.

Referring now to FIGS. 7A–8B, the decoding process of the data block following storage will next be explained. As illustrated in FIG. 7A, error correction unit 130 processes the data according to the same logical groups as formed by check bits generation unit 120. Error correction unit 130 may be configured to generate a regenerated parity bit per row (PPR') using the received data. The same parity type (even or odd) is used during both encoding and decoding. In the example of FIG. 7A, two errors are introduced into the received data set, both occurring in column D2, as shown with underlines. More particularly, the bits in rows R1 and R3 of column D2 have been changed to exemplify errors. Such errors could be the result of, for example, a faulty memory chip that stores the column D2 bits of the data set. Thus, for this example, the regenerated parity bits for rows R1 and R3 change state. A bit for each row indicating that a parity error exists may be generated by XORing the original parity bits with the regenerated parity bits. It is noted that generation of these row parity error bits (RPEs) may instead be generated directly by XORing corresponding bits of the received data bits with the original parity bits (PPRs) (without separately generating the regenerated parity bits (PPRs)).

If any of the rows have a single bit error, as indicated by the row parity error bits (RPEs), the error correction unit 130 generates a regenerated global error correction code in the same manner in which the original global error correction code was generated, using the regenerated error correction codes. Thus, in one embodiment, the regenerated global error correction code may be derived by shifting the error correction code for a given ith group by i bit positions, where i=0–X−1, and by XORing the bits in the resulting vertically aligned columns, as depicted in FIG. 7B. Similar to the previous discussion, in other embodiments, the regenerated global error correction code may be derived directly from a predetermined function of the received data bits, without generating an individual error correction code for each row. In such embodiments, however, the global error correction code is equivalent to a predetermined combination of a set of error correction codes each individually associated with a corresponding row.

Figure 8A:
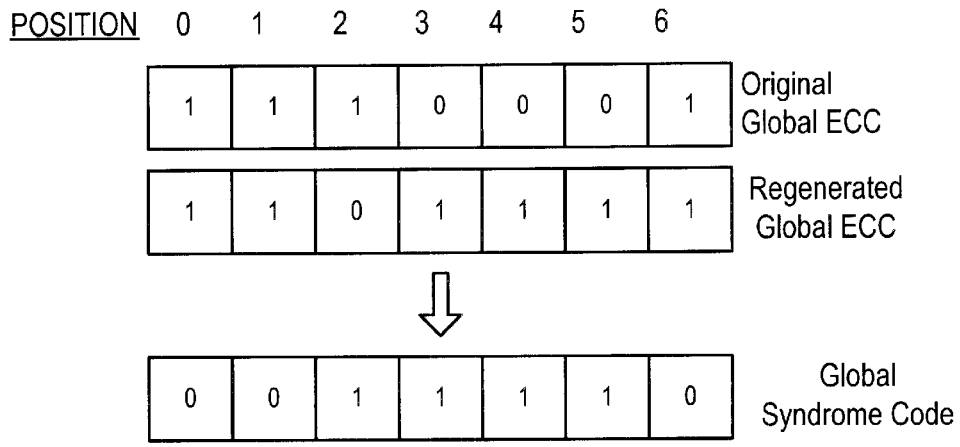
FIG. 8A illustrates a manner in which a global syndrome code may be generated.

As shown in FIG. 8A, upon generation of the regenerated global error correction code, a global syndrome code may be generated by XORing the original global error correction code with the regenerated global error correction code. This global syndrome code is indicative of a difference between the original global error correction code and the regenerated global error correction code. In embodiments in which the error correction codes for various logical groups are effectively shifted in a twisted manner and are XORed, the global syndrome code includes a bit corresponding to each aligned column of the regenerated shifted error correction codes which indicates whether a parity error for that column exists. For instance, in the example of FIG. 8, the bits in the global syndrome code for positions 2, 3, 4 and 5 are set. This is the result of the fact that the parity in each of columns 2, 3, 4 and 5 of the shifted regenerated error correction codes of FIG. 7B is different from the parity of each of the corresponding columns of the original shifted error correction codes, as depicted in FIG. 6B. Accordingly, in this embodiment the global syndrome code includes a bit corresponding to each aligned column of the regenerated shifted error correction codes which indicates whether a parity error for that column exists. Since the regenerated error correction codes for the logical groups that have errors will incur changes at exactly the same bit positions, by shifting in a twisted manner the various error correction codes and XORing the resulting bit aligned columns, the correlation that exists with respect to changes in the error correction codes for logical groups that have errors may be exploited to thereby extract information indicating the specific positions of the errors.

Figure 8B:
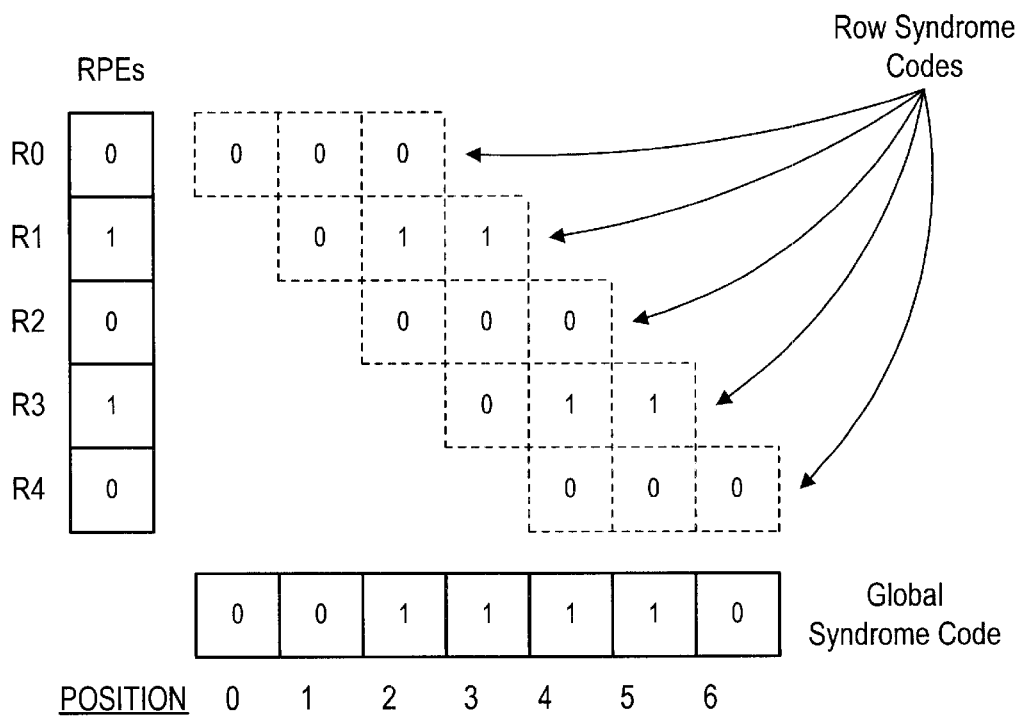
FIG. 8B illustrates a manner in which a set of row syndrome codes may be generated.

For example, FIG. 8B illustrates a manner in which a set of row syndrome codes, each of which is indicative of the position of an error in a given row, may be generated using the global syndrome code and the row parity error information. As illustrated in FIG. 8B, entries (initially unfilled) for each row syndrome code are provided by shifting the entries in the same manner in which the error correction codes were shifted to generate the global error correction code. First, the row syndrome codes for any rows that do not have errors can be filled in with all "0" values (since rows without errors could not contribute to a parity error in any given column, as identified by the global syndrome code). Thus, the row syndrome code entries for rows R0, R2, and R4 can be filled in with all "0" values. As depicted in FIG. 8B, the first row with an error is row R1. Since the first bit of the row syndrome code for row R1 is in column position 1, and since the global syndrome value for that bit position is 0 and the only other contributing value for that bit position of the global syndrome code is derived from the row syndrome code for row R0 (which is already known to be "0"), the value of the first bit of the row syndrome code for row R1 can be filled in as "0". Additionally, since the row syndrome code for every row with an error is known to be identical, the first bit of the row syndrome code for row R3 can also be filled in as a "0". Subsequently, the second bit of the syndrome code for row R1 may be similarly determined by considering the value in bit position 2 of the global syndrome, and the values of the bits in position 2 of rows 0 and 2 (i.e., the last bit of the row syndrome code for row R0 and the first bit of the row syndrome code for row R2). In this situation, the value of the second bit of the row syndrome code for row R1 may be filled in as a "1". Again, this value is also reflected in the second bit of the row syndrome code for row R3. The last bit of the row syndrome codes may be determined similarly.

The binary value of the row syndrome codes (taken in reverse order with respect to the depicted values in FIG. 8B) thus indicates the position of the error for logical groups that have errors. Therefore, in this example, the value "110", which is binary 6, correlates to bit position D2, as shown in FIG. 3. This position corresponds to the position of the errors introduced in the example shown in FIG. 7A.

Upon determination of the erroneous bits in the received data set, the error correction unit 230 is configured to correct the data, as needed. For example, in the example of FIGS. 6–8, the bits in column D2 of the rows R1 and R3 are identified as being erroneous. Accordingly, error correction unit 230 inverts these bits and outputs the data as corrected via data output 155.

Figure 9:
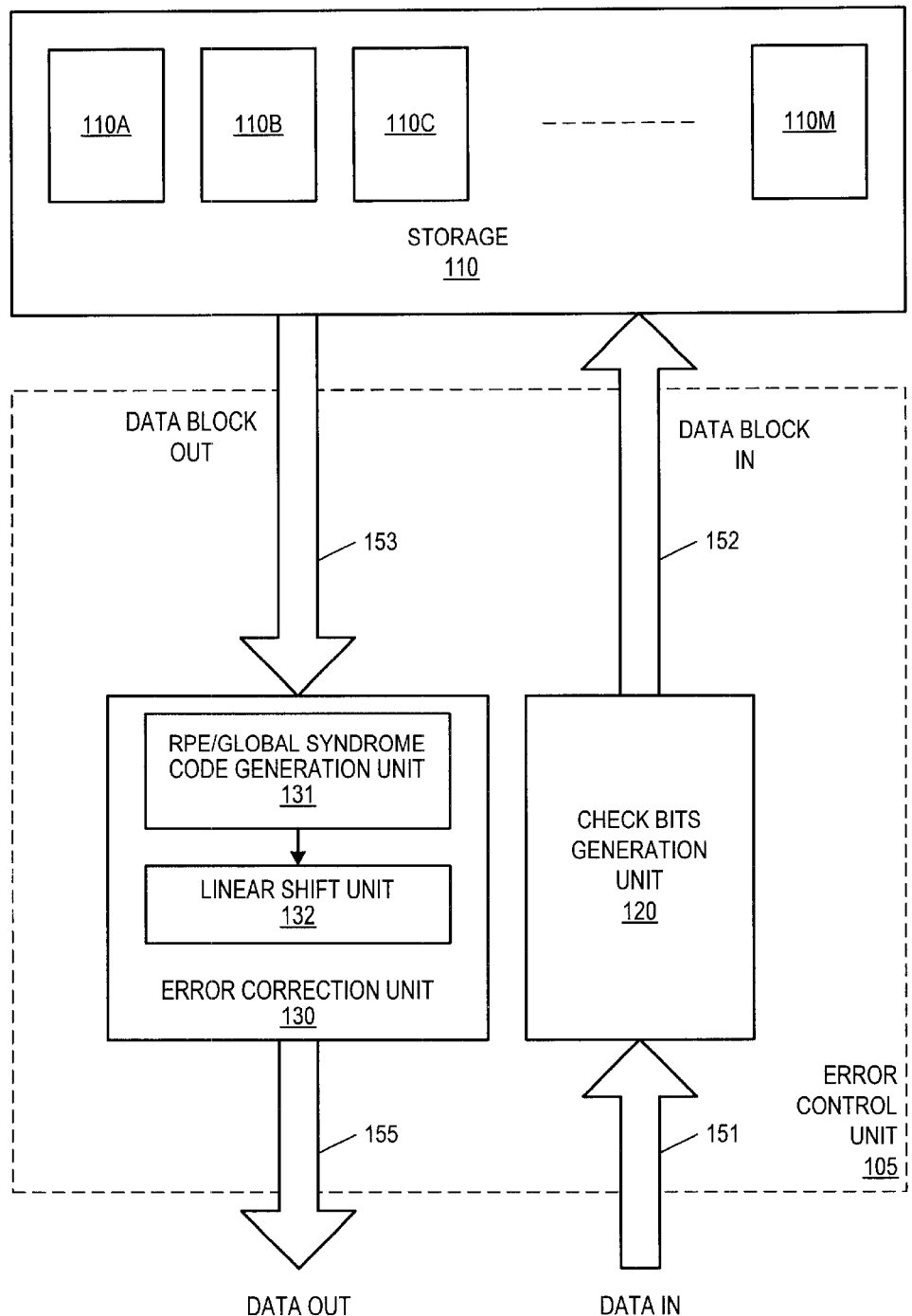
FIG. 9 is a block diagram of a system including a linear shift unit for decoding a data block.
Figure 10:
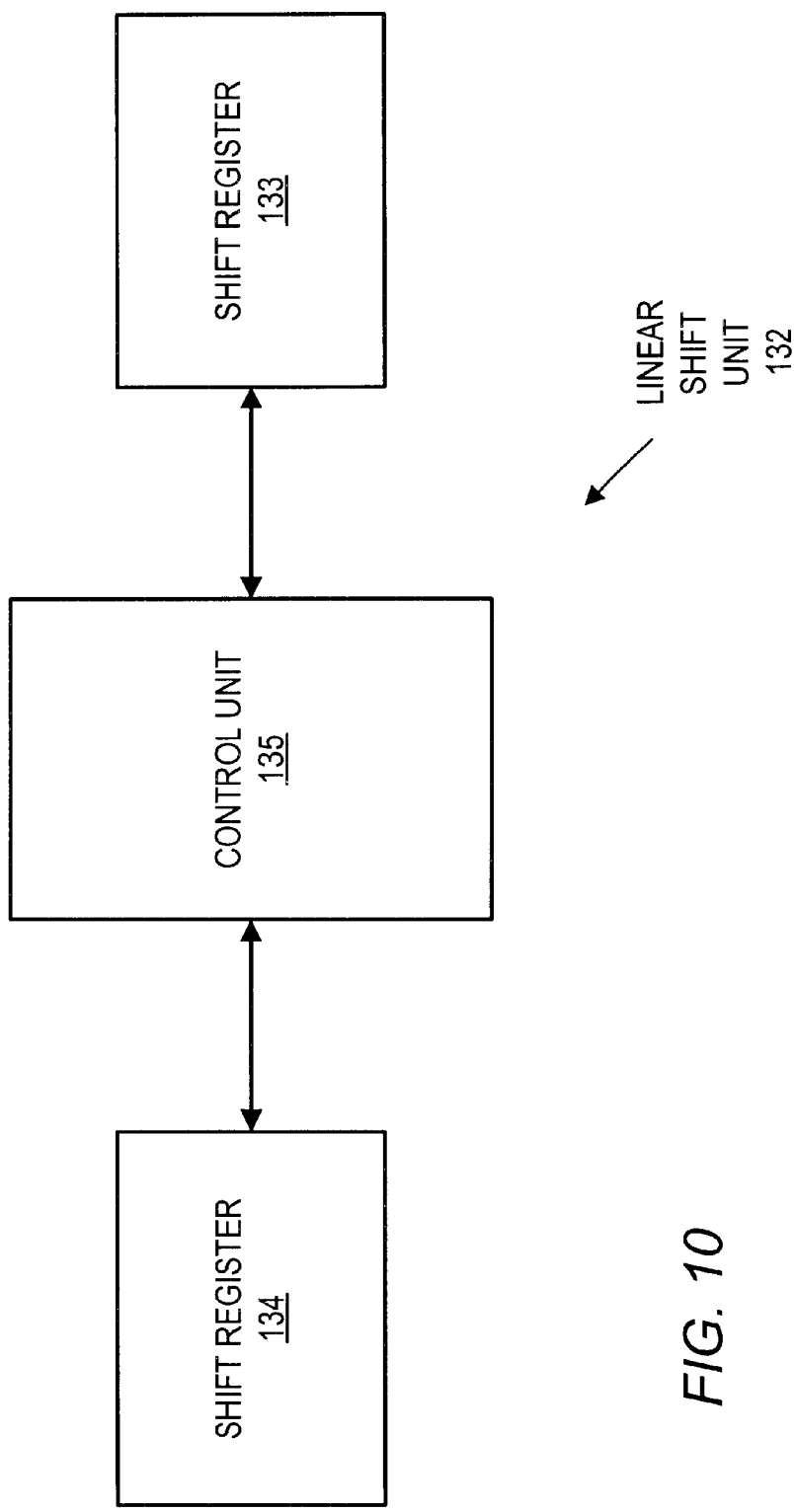
FIG. 10 is a functional block diagram of a linear shift unit.

Turning next to FIGS. 9–17, a manner in which the row parity information and the global syndrome information may be decoded to generate the row syndrome code is next considered. More particularly, as illustrated in FIG. 9, error correction unit 130 may employ an RPE/global syndrome code generation unit 131 and a linear shift unit 132 for decoding a received data block which is encoded using the linear shifting methodology as described above. A functional block diagram illustrating functional aspects of the linear shift unit 132 is illustrated in FIG. 10. As shown, linear shift unit 132 includes a control unit 135 coupled to a pair of shift registers 133 and 134. The various functionality illustrated in FIGS. 9 and 10 may be implemented in hardware, in software, or using a combination thereof.

The RPE/global syndrome code generation unit 131 generates the row parity error bits (RPEs) and the global syndrome code in accordance with the foregoing description using the received data block. The row parity error bits (RPEs) and the global syndrome code are then provided to the linear shift unit 132.

Figure 11:
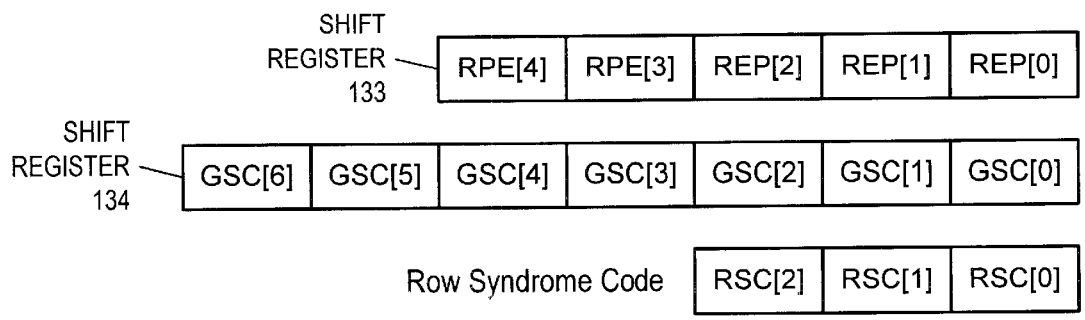
FIGS. 11–17 illustrate an exemplary generation of a row syndrome code.
Figure 12:
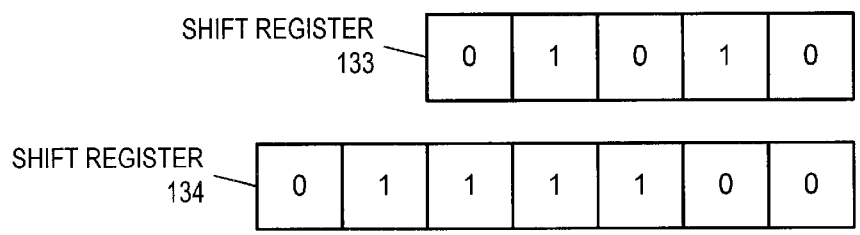
Figure 16:
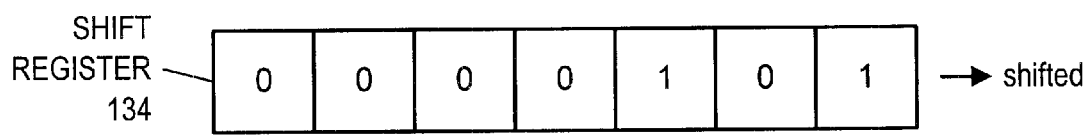
Figure 17:
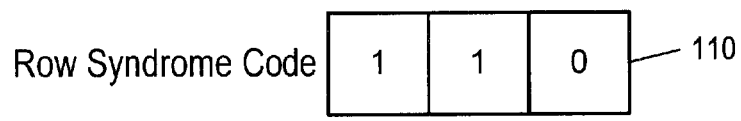
Figure 18:
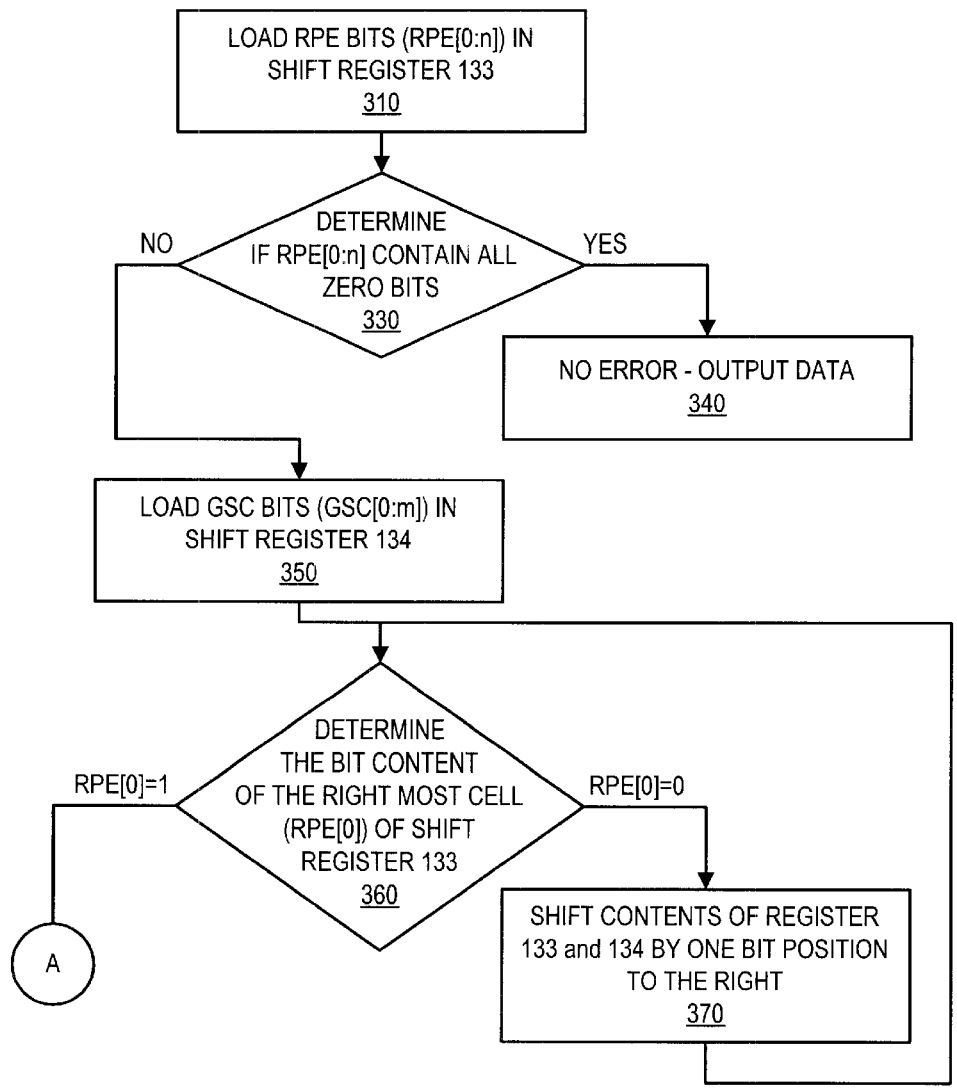
FIGS. 18 and 19 illustrate a flow diagram illustrating one embodiment of a linear decode process.
Figure 19:
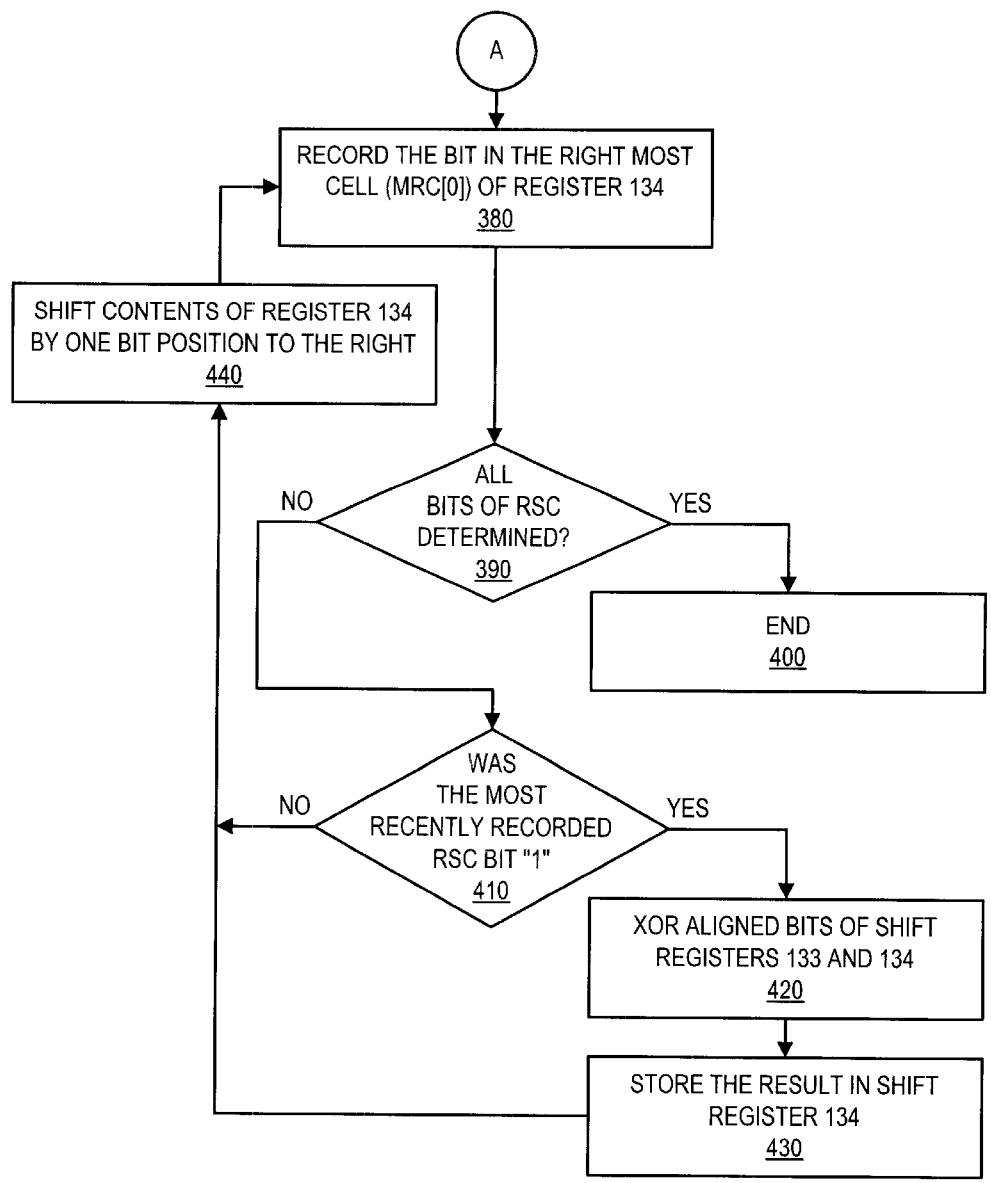

The operation of the linear shift unit 132 is explained with reference to FIGS. 11–17, along with the flow diagrams of FIGS. 18–19. As illustrated in FIG. 11, shift register 133 includes a plurality of cells RPE[0:4] for storing the row parity error bits (RPEs) for rows 0–4, respectively. Similarly, shift register 134 includes a plurality of cells GSC[0:6] for storing the global syndrome code. Referring collectively to FIGS. 11 and 18, initially, the row parity error bits RPEs are loaded into shift register 133, and control unit 135 determines whether the shift register contains all "0"s (steps 310 and 330). If shift register 133 contains all 0s, thus indicating that no single bit row errors exist, no data error is reported, and the data is output from the error control unit (step 340). On the other hand, if one or more row parity error bits are set, the global syndrome code is loaded into shift register 134 (step 350). FIG. 12 illustrates the contents of shift registers 133 and 134 at this point in the methodology for the exemplary RPEs and global syndrome code generated for the example associated with FIG. 8B.

Figure 13:
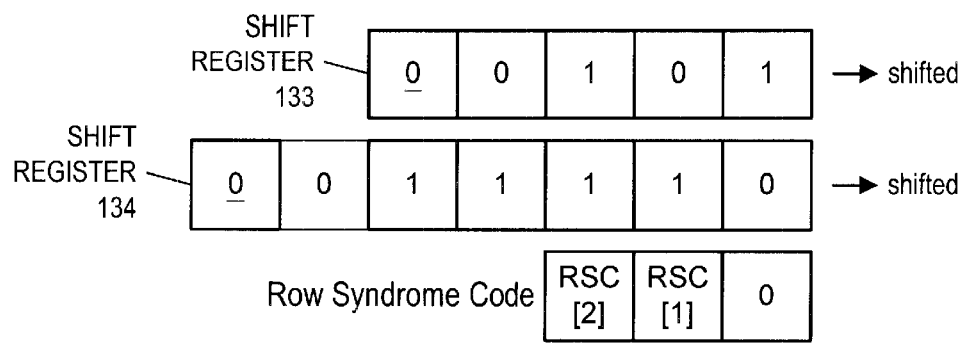

The content of the right-most cell of shift register 133 (cell RPE[0]) is then determined during step 360. If the value in the right-most cell RPE[0] of the shift register 133 is "0", the contents of both the shift register 133 and the shift register 134 are shifted one bit position to the right (step 370). The left-most parity in each of these registers is padded with a "0", and the values which are shifted from the right-most positions are discarded. This process repeats until the value in the right-most cell RPE[0] of register 133 is a "1". FIG. 13 illustrates the resulting values in shift registers 133 and 134 following this operation for the exemplary codes.

Figure 14:
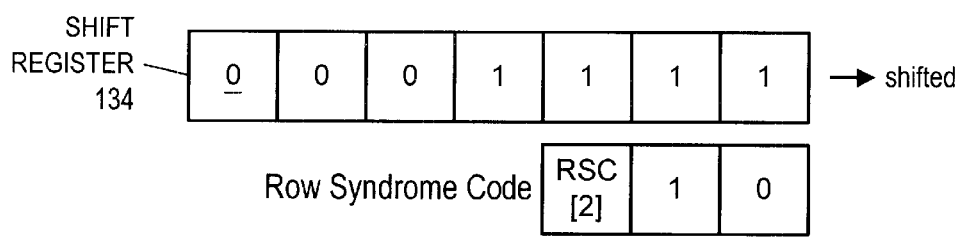

At this point, the bit value in the right-most cell of the register 134 is recorded as row syndrome code bit RSC[0], as is also shown in FIG. 13 (step 380). If all the row syndrome code bits have not yet been determined (step 390), a determination is made as to whether the last recorded row syndrome code bit was 1. If not, the contents of shift register 134 are again shifted by one position to the right (step 44), and the process repeats. On the other hand, if the last row syndrome code bit recorded was 1, aligned bit positions of the first and second shift registers are XORed and the result is stored in the second shift register 134 (steps 420 and 430). In the illustrated example, the most recently recorded row syndrome code bit was "0", and thus the contents of the second shift register 134 are shifted by one position to the right (step 440), and the process repeats by recording the value in the right-most position of register 134 as the next RSC bit, as illustrated in FIG. 14.

Figure 15:
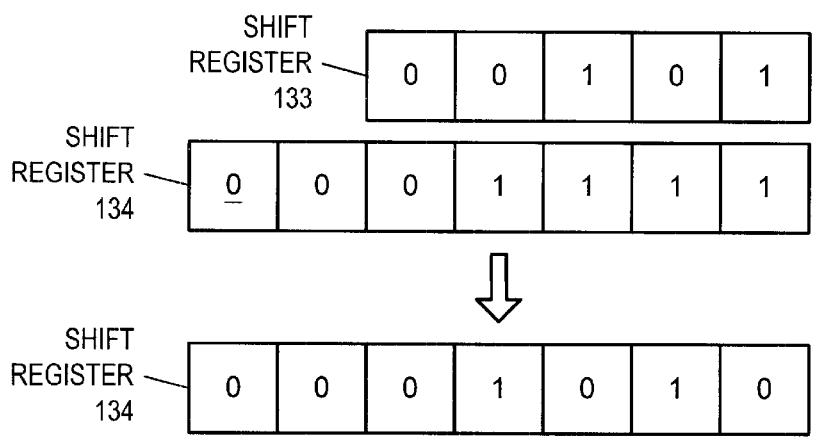

During the next iteration, since the last recorded RSC bit was "1", the value in shift register 133 is XORed with the value in shift register 134 (step 420) and the result is stored in shift register 134, as illustrated in FIG. 15. The contents of register 134 are again shifted by one position to the right as illustrated in FIG. 16 (step 440) and the resulting bit in the right-most position of shift register 134 is recorded as the next RSC bit, as illustrated in FIG. 17 (step 380). When all bits of the row syndrome code have been determined, the process ends (step 400).

The row syndrome code is indicative of the position of the error for any rows with a single bit error. In the illustrated example, the binary value of the row syndrome code is 6. Referring to FIG. 3, bit position 6 corresponds to column D2, which is the position of the errors introduced in the example of FIG. 7A.

It is noted that alternative embodiments of the linear shift decode methodology described in conjunction with FIGS. 9–19 are possible. For example, rather than right shifting the values in shift registers 133 and 134, the values may be left shifted in a similar manner to derive the row syndrome code.

It is also noted that the received check bits may be decoded using other mechanisms. For example, mechanisms employing Gaussian Elimination could be used to decode the row parity error bits and the global syndrome code to derive a row syndrome code.

FIGS. 20–35 are tables which illustrate another embodiment of a system which employs the linearly shifted technique for global syndrome code generation as described above. In the embodiment depicted by FIGS. 20–35, 267 bits of data are protected with 21 check bits. The code is defined in terms of 288-bit blocks. The data bits within a block are denoted D[266:0]. The 21 check bits within a block consist of 8 parity bits P[7:0] and a global syndrome code consisting of 13 twisted check bits T[12:0].

The 288-bit block is divided into eight groups, denoted G[0] through G[7], each of which contains 36 bits. This code can correct one error per group G[0] through G[7], provided that all of the errors occur in the same position within each group.

The parity bits P[7:0] and twisted check bits T[12:0] are calculated according to the tables of FIGS. 20–27. Each table lists the 36 bit positions within the group and the contents of each bit position. For example, G[0][0] contains P[0], G[0][29] contains D[23], and G[1][32] contains T[6], and so on. The remaining rows in each table give the rules for calculating the check bits. Each check bit is the exclusive-or of certain values. More particularly, the values which contribute to a particular check bit are indicated using a "1" at the appropriate positions in the tables. For example, parity bit P[0] is the exclusive-or of G[0][35:1]. Since the parity bits P[7:0] depend upon certain ones of the twisted check bits T[12:0], the twisted check bits T[12:0] can be calculated first, and subsequently the parity bits P[7:0].

It is noted that in this example, there are total of 36 entries in each group. Accordingly, the system may be constructed such that a total of 36 memory chips are used, each storing a bit from a corresponding position of each group.

When the data are received, parity error bits Q[7:0] and regenerated twisted check bits V[12:0] (the regenerated global ECC) are calculated by taking the exclusive-or of the received values, in accordance with the assignment tables of FIGS. 28–35. In addition, a global parity error bit Q may be calculated taking the exclusive-or of Q[7:0].

Figure 36:
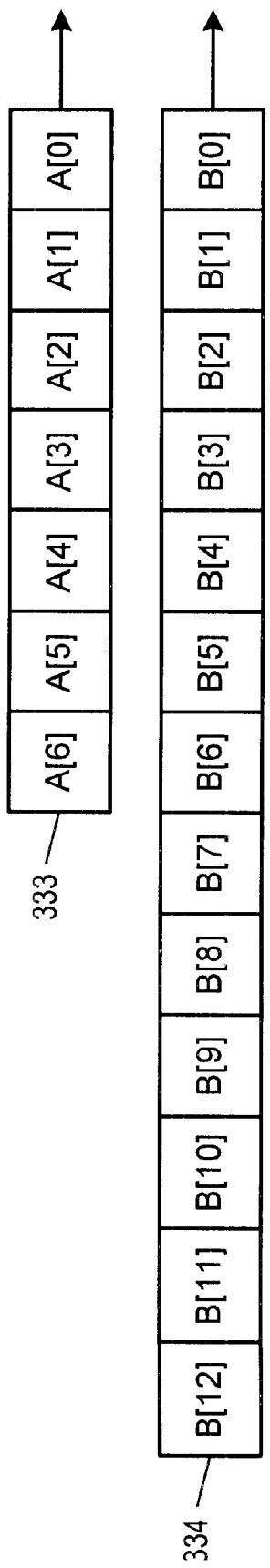
FIG. 36 illustrates a linear decode process.

In certain cases, it is necessary to generate an untwisted syndrome U[5:0] (i.e., the row or group syndrome code). This untwisted syndrome is a function of V[12:0] and Q[6:0]. As illustrated in FIG. 36 and like the previous example, the untwisted syndrome U[5:0] can be calculated using parallel shift registers, 333 and 334, which are similar to the registers 133 and 134 illustrated in FIG. 10.

Shift register 333 contains 7 cells, A[6:0], and shift register 334 contains 13 cells, B[12:0]. Each cell holds a single bit. The shift registers 333 and 334 are separately controlled. When a shift register is made to shift, it transfers the contents of each cell one position to the right, outputs the value that was in its right-most cell, and loads a "0" into its left-most cell. Similar to the previous description, it is also possible to calculate the XOR of shift register 333 and shift register 334 and store the contents into shift register 334 (shift register 333 is logically padded with 0s in positions 12:7 when the XOR is computed).

The untwisted syndrome U[5:0] is calculated as follows:
 1. Load Q[i] in cell A[i], $0 \leq i \leq 6$, and load V[i] in cell B[i], $0 \leq i \leq 12$.
 2. While A[0] contains 0:
  a. Shift both shift register 333 and shift register 334 right one position, discarding the values shifted out.
 3. For i=0 through 5:
  a. Set U[i]=B[0].
  b. If B[0]=1, calculate the XOR of shift register 333 and shift register 334 and place the result in shift register 334 (that is, B[j]=A[j] XOR B[j], $0 \leq j \leq 6$).
  c. Shift shift register 334 right one position, discarding the value shifted out.

Given Q, Q[7:0], and U[5:0], errors are corrected as follows. The description of what type of error has occurred assumes that the errors are within the considered type (namely 0 to 8 errors, all in the same position within their group).
 1. If Q=0:
  a. If Q[7:0] 00000000, no error has occurred.
  b. If Q[7:0] ≠ 00000000, a correctable error has occurred. Complement the bits in all locations of the form G[i][j], $0 \leq i \leq 7$, $0 \leq j \leq 35$, where Q[i]=1 and j=U[5:0] (viewed as a binary number). (If U[5:0]>35, an uncorrectable error not in the class of considered errors has occurred).
 2. If Q=1: A correctable error has occurred. Complement the bits in all locations of the form G[i][j], $0 \leq i \leq 7$, $0 \leq j \leq 35$, where Q[i]=1 and j=U[5:0] (viewed as a binary number). (If U[5:0]>35, an uncorrectable error not in the class of considered errors has occurred).

It is noted that no error has occurred if Q[7:0]=00000000. It is also noted that U[5:0] only needs to be calculated in cases 1.b and 2 (which indicates a correctable error has occurred).

In the embodiment illustrated by FIGS. 20–35, the global error correction code formed by twisted check bits T[12:0] are generated directly from a predetermined combination of the data bits. Each twisted check bit T[12:0] is stored at a position within each group such that it is the only check bit that covers that position. For example, as illustrated in FIG. 28, the twisted check bit T0 is stored at position G[0][01], and is the only check bit which contributes to the regenerated twisted check bit V[0], and so. In addition, it is noted that the parity bits P[7:0] for each data group include certain twisted check bits stored within that group. Since the parity bits are stored within position [00] of the various groups, further efficiency may be attained.

Alternative embodiments are also possible. For example, in another contemplated embodiment, the error correction codes generated for the logical groups are "cyclically" shifted (rather than linearly shifted) and are XORed together to derive the global error correction code as well as the regenerated error correction code. Embodiments that produce P global error correction bits are possible, where P is the smallest prime number such that P>X and $2^{(P-1)} \geq M$. In such embodiments, and where a total of C=X+P check bits are required. Such techniques may utilize fewer overall check bits than embodiments which employ linearly shifted techniques as described previously.

Still additional embodiments may also be possible wherein a global syndrome code is generated using other methods. In such embodiments, the stored or transmitted global error correction code is dependent upon or equivalent to a logical combination of a set of error correction codes associated with the logical groups of the original data, while the regenerated global error correction code is dependent upon or equivalent to a logical combination of a set of error correction codes associated with the logical groups of the received or retrieved data bits. The global syndrome code is generated such that, with knowledge of the specific logical groups that have a single bit error, a value indicative of the location of the error in such groups may be derived from the syndrome code. The overall number of bits forming the global syndrome code and the parity bits for each logical group is smaller than the overall number of bits needed for the error correction codes individually associated with the logical groups.

Figure 37:
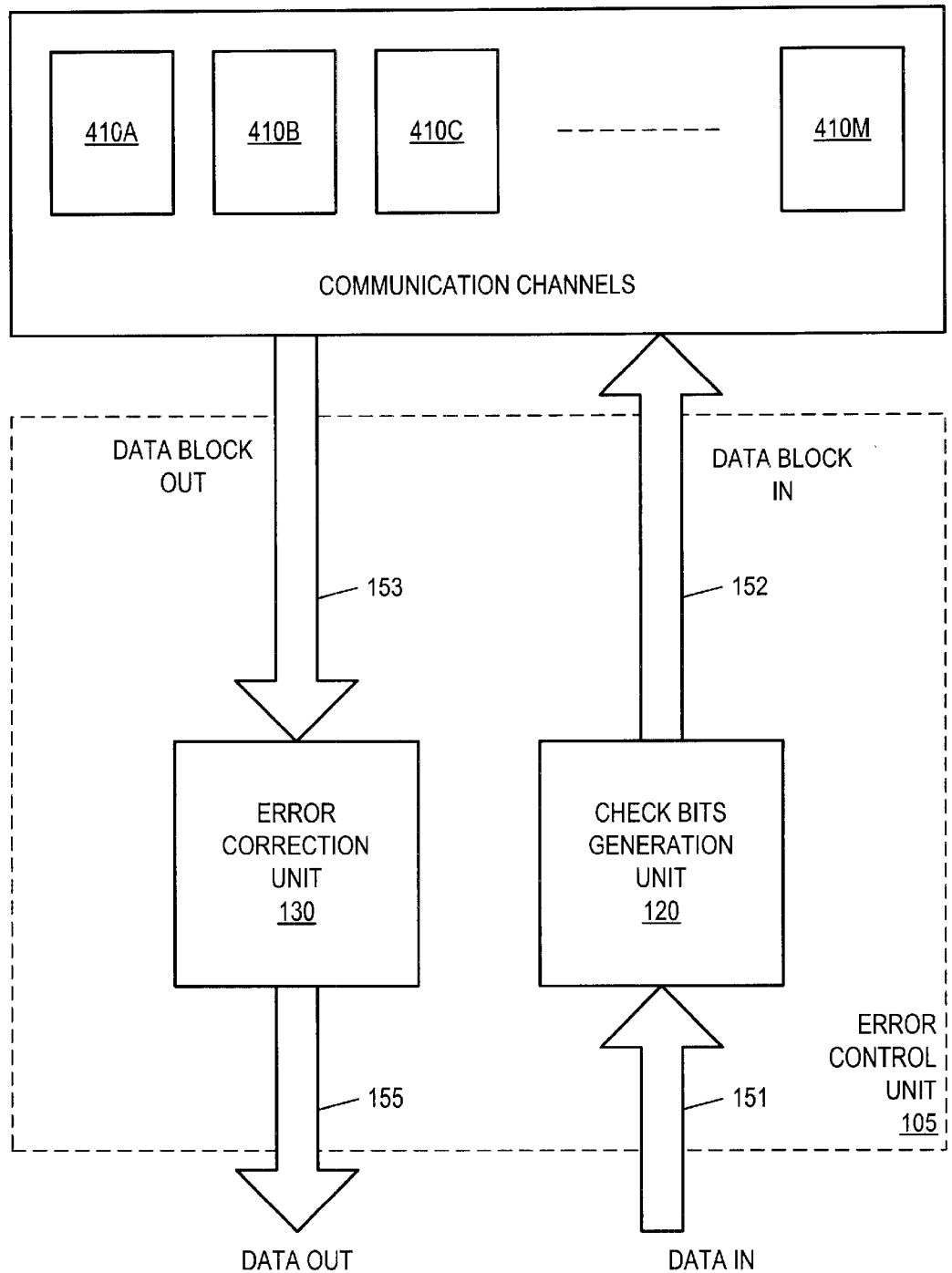
FIG. 37 is a block diagram of a system in accordance with another embodiment of the present invention.

Finally, FIG. 37 illustrates an embodiment wherein a data block protected in accordance with the foregoing techniques is conveyed through a plurality of communication channels 410A . . . 410M. Each communication channel 410A–410M is illustrative of, for example, a wire or other transmission medium. Similar to the previous embodiments, different bits in each logical group are conveyed through different communication channels.

While the present invention has been described with reference to particular embodiments, it will be understood that the embodiments are illustrative and that the invention scope is not so limited. Any variations, modifications, additions and improvements to the embodiments described are possible. These variations, modifications, additions and improvements may fall within the scope of the invention as detailed within the following claims.

What is claimed is:
 1. A system for correcting data errors, comprising:
  a check bits generation unit for receiving a plurality of data bits, wherein said check bits generation unit is configured to generate a parity bit corresponding to each of a plurality of groupings of said data bits, and wherein said check bits generation unit is configured to generate a global error correction code equivalent to a predetermined combination of a set of error correction codes each individually associated with a corresponding one of said plurality of groupings, wherein the global error correction code is expressed using a smaller number of bits than a total number of bits of said set of error correction codes;

an error correction unit coupled to receive said plurality of data bits, said parity bit for each of said plurality of groupings, and said global error correction code, wherein said error correction unit is configured to generate a parity error bit indicating whether a parity error exists for each of said plurality of groupings of said data bits as received, and wherein said error correction unit is configured to generate a syndrome code indicating a position of an error within any of said plurality of groupings, wherein said syndrome code depends upon a difference between said global error correction code and a regenerated global error correction code, and wherein said error correction unit is configured to correct the received data depending upon said parity error bits and said syndrome code.

2. The system as recited in claim 1 wherein said global error correction code is equivalent to a predetermined function of said set of error correction codes.

3. The system as recited in claim 2 wherein each bit of said global error correction code is equivalent to an exclusive OR of a predetermined set of bits of said set of error correction codes.

4. The system as recited in claim 1 wherein said global error correction code is a function of said set of error correction codes such that a combination of said global error correction code, said regenerated global error correction code, and said parity error bits uniquely determine said syndrome code.

5. The system as recited in claim 1 wherein said check bits generation unit is configured to generate an error correction code for each of said plurality of groupings of said data bits.

6. The system as recited in claim 1 wherein said global error correction code is equivalent to a result of bit-wise shifting at least some of said error correction codes and by XORing aligned bits of a plurality of resulting shifted error correction codes.

7. The system as recited in claim 6 wherein said plurality of data bits include a total of X groupings, and wherein said global error correction code is equivalent to a result of shifting said error correction code for a given ith group by i bit positions, wherein i=0 to X−1, and by XORing a plurality of resulting shifted error correction codes together.

8. The system as recited in claim 7 wherein said global error correction code is equivalent to a result of linearly shifting said error correction code for said given ith group by i bit positions.

9. The system as recited in claim 7 wherein said global error correction code is equivalent to a result of cyclically shifting said error correction code for said given ith group by i bit positions.

10. The system as recited in claim 6 wherein said error correction unit is configured to generate a global syndrome code by XORing said global error correction code with said regenerated global error correction code.

11. The system as recited in claim 10 wherein said plurality of data bits include a total of X groupings, and wherein said global error correction code is equivalent to a result of shifting said error correction code for a given ith group by i bit positions, wherein i=0 to X−1, and by XORing a plurality of resulting shifted error correction codes together.

12. The system as recited in claim 11 wherein each bit of said global syndrome code indicates whether the parity associated with an aligned column of bits of said plurality of resulting shifted error correction codes is the same as a parity associated with corresponding aligned bits of a plurality of shifted error correction codes based upon said regenerated error correction codes for said plurality of groupings.

13. The system as recited in claim 11 wherein said parity error bit for each of said plurality of groups and said global syndrome code are used to generate said syndrome code indicating a position of said error within any of said plurality of groupings.

14. The system as recited in claim 13 wherein said error correction unit is further configured to correct said error within any of said plurality of groupings.

15. The system as recited in claim 1 further comprising a component into which said plurality of data bits, said parity bit for each of said plurality of groupings, and said global error correction code are conveyed prior to being provided to said error correction unit.

16. The system as recited in claim 15 wherein said component includes a plurality of memory chips.

17. The system as recited in claim 16 wherein each bit within a particular grouping of data bits is stored in a separate memory chip, whereby no two bits of any given grouping are stored within the same memory chip.

18. The system as recited in claim 17 wherein bits at corresponding positions within the said plurality of groupings are stored within the same memory chip.

19. The system as recited in claim 15 wherein said component includes a plurality of communication paths.

20. The system as recited in claim 1 wherein said error correction code for each of said plurality of groupings is a single error correction Hamming code.

21. A method for correcting data errors comprising:
receiving a plurality of data bits;
generating a parity bit corresponding to each of a plurality of groupings of said data bits;
generating a global error correction code equivalent to a predetermined combination of a set of error correction codes each individually associated with a corresponding one of said plurality of groupings, wherein the global error correction code is expressed using a smaller number of bits than a total number of bits of said set of error correction codes;
receiving said plurality of data bits, said parity bit for each of said plurality of groupings, and said global error correction code;
generating a parity error bit indicating whether a parity error exists for each of said plurality of groupings of said data bits as received;
generating a syndrome code indicating a position of an error within any of said plurality of groupings, wherein said syndrome code depends upon a difference between said global error correction code and a regenerated global error correction codes and
correcting the received data depending upon said parity error bits and said syndrome code.

22. The method as recited in claim 21 wherein said global error correction code is equivalent to a predetermined function of said set of error correction codes.

23. The method as recited in claim 22 wherein each bit of said global error correction code is equivalent to an exclusive OR of a predetermined set of bits of said set of error correction codes.

24. The method as recited in claim 21 wherein said global error correction code is a function of said set of error correction codes such that a combination of said global error correction code, said regenerated global error correction code, and said parity error bits uniquely determine said syndrome code.

25. The method as recited in claim 21 wherein said check bits generation unit is configured to generate an error correction code for each of said plurality of groupings of said data bits.

26. The method as recited in claim 21 wherein said global error correction code is equivalent to a result of bit-wise shifting at least some of said error correction codes and by XORing aligned bits of a plurality of resulting shifted error correction codes.

27. The method as recited in claim 26 wherein said plurality of data bits include a total of X groupings, and wherein said global error correction code is equivalent to a result of shifting said error correction code for a given ith group by i bit positions, wherein i=0 to X−1, and by XORing a plurality of resulting shifted error correction codes together.

28. The method as recited in claim 27 wherein said global error correction code is equivalent to a result of linerly shifting said error correction code for said given ith group by i bit positions.

29. The method as recited in claim 27 wherein said global error correction code is equivalent to a result of cyclically shifting said error correction code for said given ith group by i bit positions.

30. The method as recited in claim 26 further comprising generating a global syndrome code by XORing said global error correction code with said regenerated global error correction code.

31. The method as recited in claim 30 wherein said plurality of data bits include a total of X groupings, and wherein said global error correction code is derived by shifting said error correction code for a given ith group by i bit positions, wherein i=0 to X−1, and by XORing a plurality of resulting shifted error correction codes together.

32. The method as recited in claim 31 wherein each bit of said global syndrome code indicates whether the parity associated with an aligned column of bits of said plurality of resulting shifted error correction codes is the same as a parity associated with corresponding aligned bits of a plurality of shifted error correction codes based upon said regenerated error correction codes for said plurality of groupings.

33. The method as recited in claim 32 wherein said parity error bit for each of said plurality of groups and said global syndrome code are used to generate said syndrome code indicating a position of said error within any of said plurality of groupings.

34. The method as recited in claim 33 further comprising correcting said error within any of said plurality of groupings.

35. The method as recited in claim 21 further comprising conveying said plurality of data bits, said parity bit for each of said plurality of groupings, and said global error correction code into a component.

36. The method as recited in claim 35 wherein said component includes a plurality of memory chips.

37. The method as recited in claim 36 wherein each bit within a particular grouping of data bits is stored in a separate memory chip, whereby no two bits of any given grouping are stored within the same memory chip.

38. The method as recited in claim 37 wherein bits at corresponding positions within the said plurality of groupings are stored within the same memory chip.

39. The method as recited in claim 35 wherein said component includes a plurality of communication paths.

40. The method as recited in claim 21 wherein said error correction code for each of said plurality of groupings is a single error correction Hamming code.

* * * * *

UNITED STATES PATENT AND TRADEMARK OFFICE
CERTIFICATE OF CORRECTION

PATENT NO.    : 6,473,880 B1
DATED         : October 29, 2002
INVENTOR(S)   : Robert Cypher It is certified that error appears in the above-identified patent and that said Letters Patent is hereby corrected as shown below:

Column 15,
Line 24, please replace "linerly" with -- linearly --.
Line 37, please delete "derived by" and insert in its place -- equivalent to a result of --.

Signed and Sealed this

Thirteenth Day of May, 2003

JAMES E. ROGAN
*Director of the United States Patent and Trademark Office*